United States Patent [19]

Hosoya et al.

[11] Patent Number: 5,018,123
[45] Date of Patent: May 21, 1991

[54] OPTICAL INFORMATION RECORDING MEDIUM AND METHOD FOR RECORDING INFORMATION ON SAID MEDIUM AND REPRODUCING INFORMATION THEREFROM

[75] Inventors: Hideki Hosoya, Yokohama; Akio Aoki, Tokyo; Masahiko Enari; Masayuki Usui, both of Yokohama; Hiroshi Matsuoka, Kawasaki; Kazuhiko Matsuoka, Yokohama; Kazuo Minoura, Yokohama; Kenichi Suzuki, Yokohama; Satoshi Shikichi; Fumiaki Kawaguchi, both of Tokyo, all of Japan

[73] Assignee: Canon Kabushiki Kaisha, Tokyo, Japan

[21] Appl. No.: 338,335

[22] Filed: Apr. 13, 1989

Related U.S. Application Data

[63] Continuation of Ser. No. 843,593, Mar. 25, 1986, abandoned.

[30] Foreign Application Priority Data

| Mar. 29, 1985 | [JP] | Japan | 60-65465 |
| Apr. 22, 1985 | [JP] | Japan | 60-86671 |
| Apr. 22, 1985 | [JP] | Japan | 60-86672 |
| Apr. 22, 1985 | [JP] | Japan | 60-86673 |
| Apr. 22, 1985 | [JP] | Japan | 60-86674 |

[51] Int. Cl.$^5$ .............................. G11B 7/00
[52] U.S. Cl. .................. 369/44.110; 369/44.250; 369/44.280
[58] Field of Search ............ 369/44, 45, 46, 102, 369/275, 277, 278, 279, 44.11, 44.25, 44.28, 44.29; 250/202; 360/10.1, 2

[56] References Cited

U.S. PATENT DOCUMENTS

| 3,195,113 | 7/1965 | Giordano | 340/173 |
| 3,510,058 | 5/1970 | Rabedeau | 250/202 |
| 3,876,842 | 4/1975 | Bouwhuis | 369/46 |
| 4,094,010 | 6/1978 | Pepper | 363/215 |
| 4,561,082 | 12/1985 | Gerard et al. | 369/45 |
| 4,598,393 | 7/1986 | Pierce | 369/122 |

FOREIGN PATENT DOCUMENTS

| 106661 | 4/1984 | European Pat. Off. |
| 157577 | 10/1985 | European Pat. Off. |
| 59-104730 | 6/1984 | Japan |
| 59-193556 | 11/1984 | Japan |
| 59-193557 | 11/1984 | Japan |
| 59-193558 | 11/1985 | Japan |
| 2064847 | 6/1981 | United Kingdom |
| 2106302 | 4/1983 | United Kingdom |
| 2170632 | 8/1986 | United Kingdom |

OTHER PUBLICATIONS

"Servo Disk with Overlapping Servo and Data Tracks" by Comstock, IBM Tech. Disc. Bul., vol. 16, No. 6, Nov. 1973, p. 1818.
Drexon Laser Memory Card Quarterly Report No. 4, 10/1983, pp. 18-22.

Primary Examiner—Stuart S. Levy
Assistant Examiner—Kenneth B. Wells
Attorney, Agent, or Firm—Fitzpatrick, Cella, Harper & Scinto

[57] ABSTRACT

In an optical information recording medium of the type wherein information is recorded or reproduced when a light beam scans each of a plurality of mutually parallel tracking tracks, an auxiliary track is extended between the adjacent tracking tracks and has at least one portion in parallel with the tracking tracks. In a method of recording or reproducing information by scanning a light beam on each of a plurality of mutually parallel tracking tracks on the recording medium, the recording medium has an auxiliary track which is extended between the adjacent tracking tracks and which has at least one portion in parallel with the tracking tracks and the light beam is kicked in the parallel portion of the auxiliary track.

23 Claims, 15 Drawing Sheets

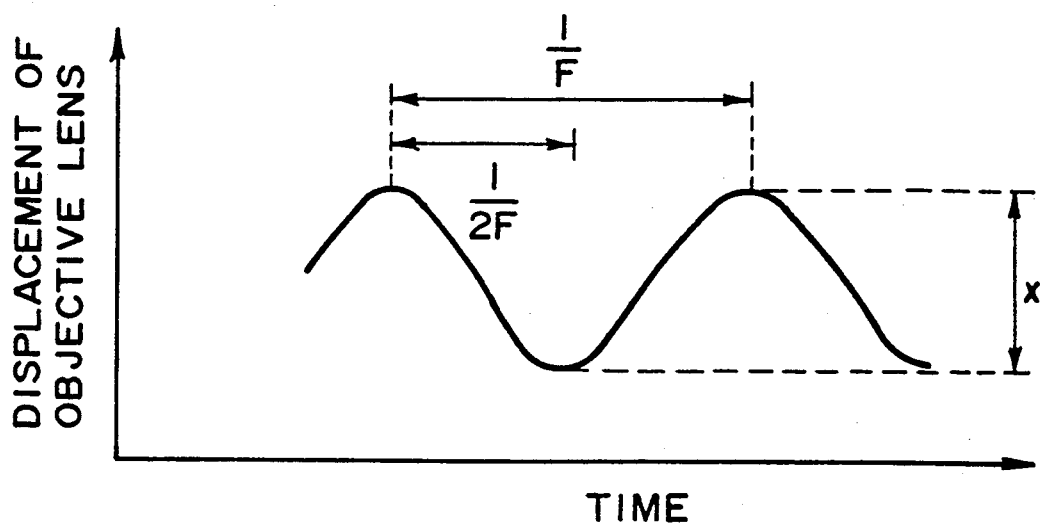
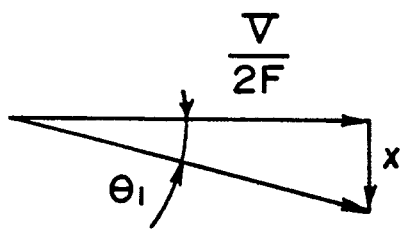
F I G. 11
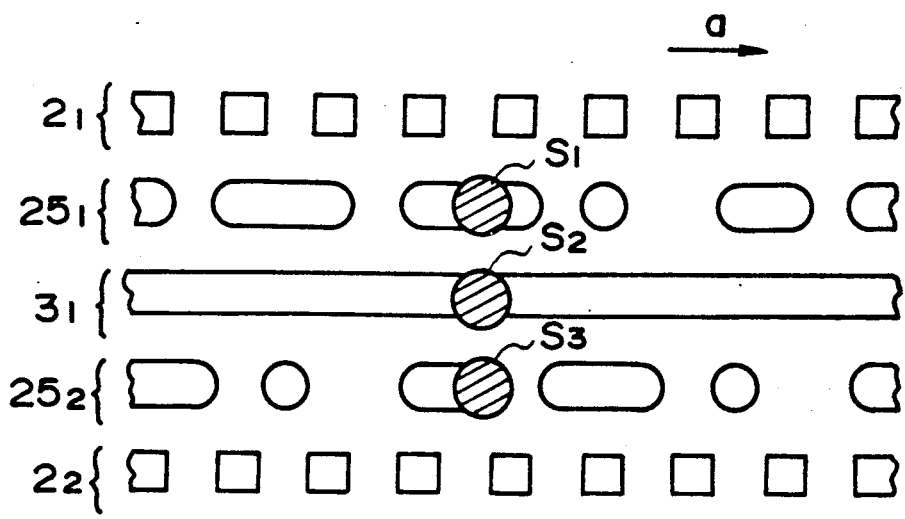
F I G. 12

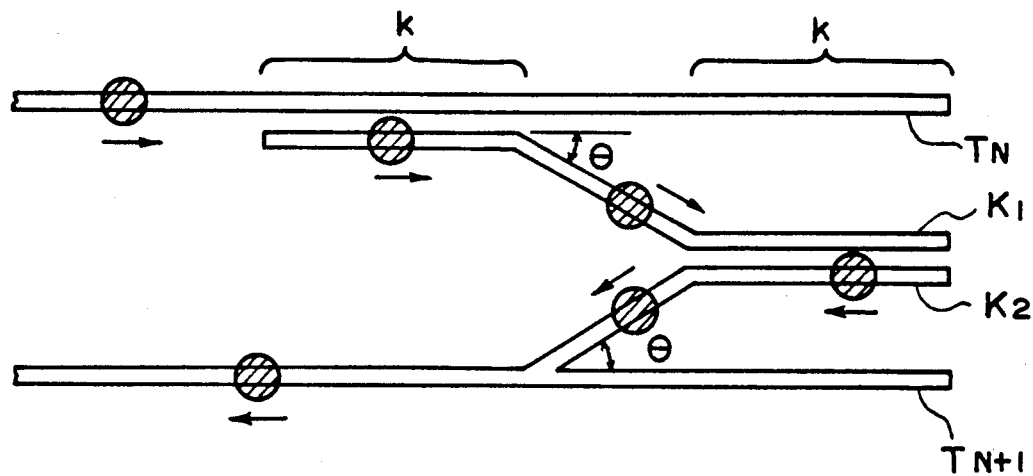
F I G. 14
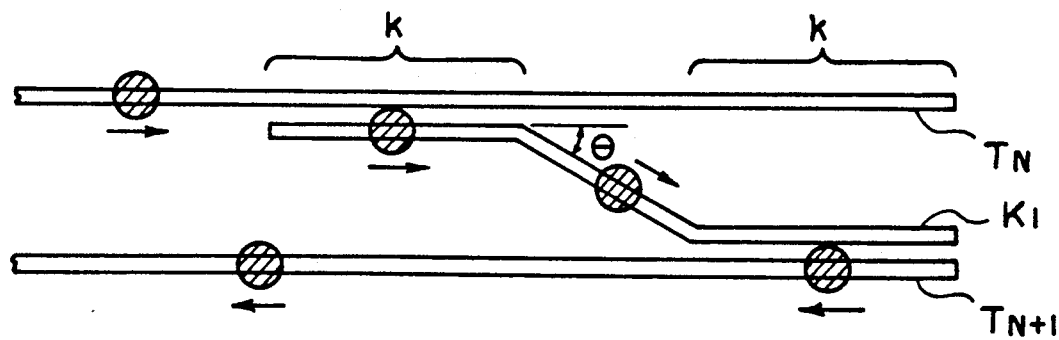
F I G. 15

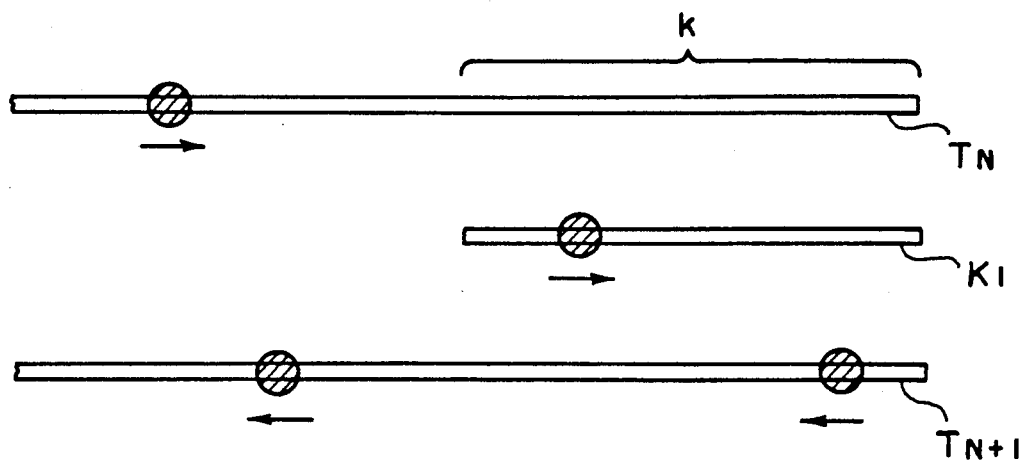
F I G. 16
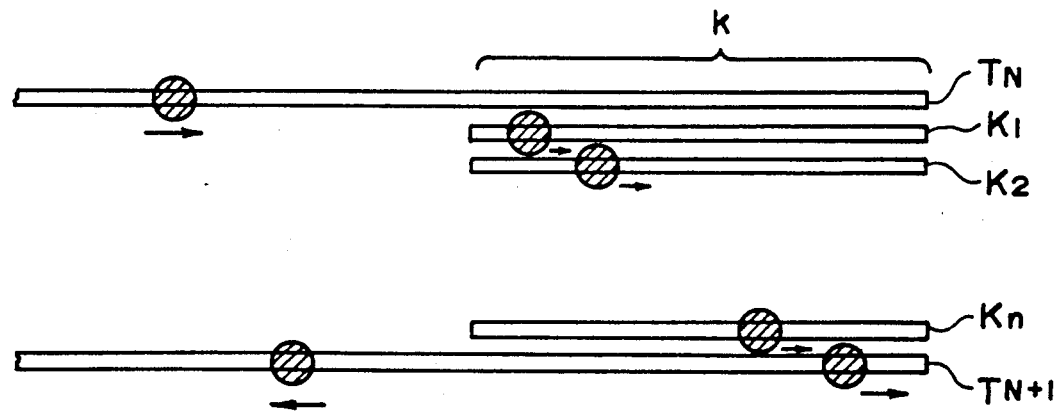
F I G. 17

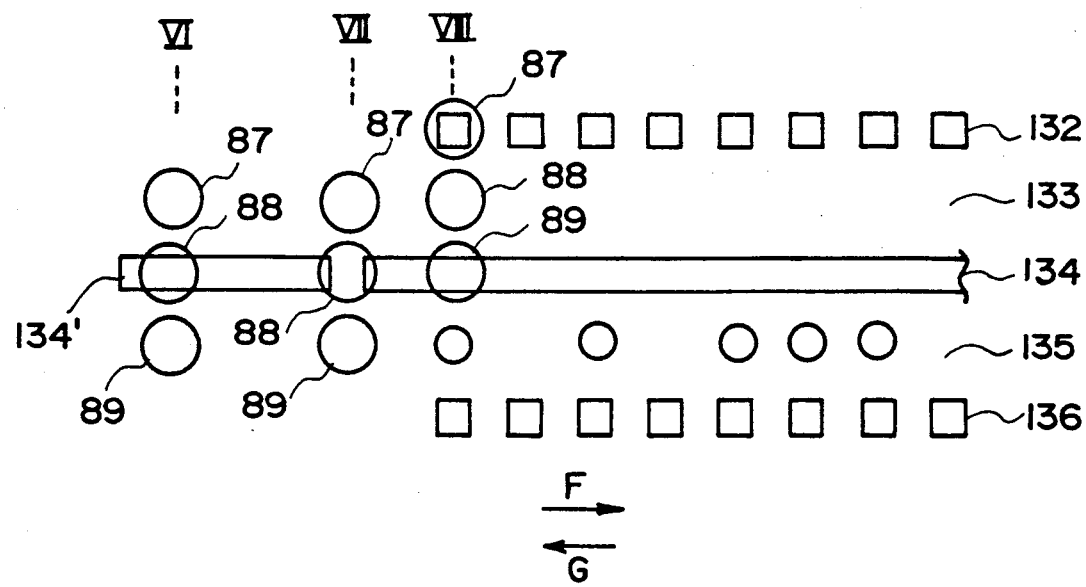
F I G. 22
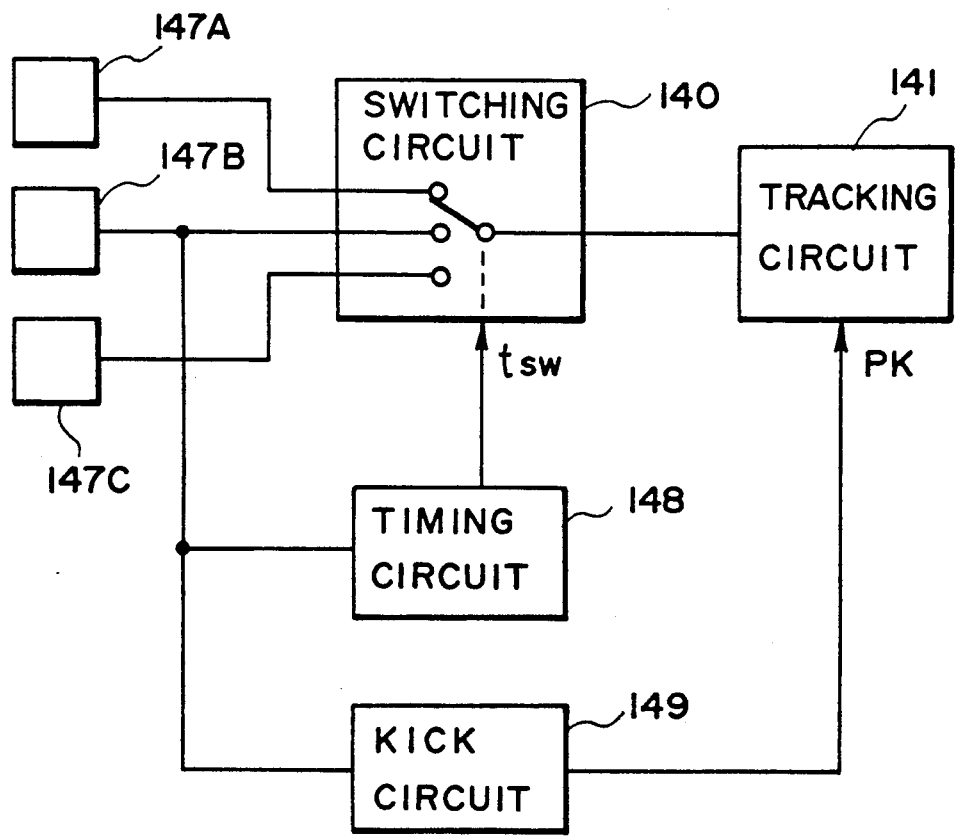
F I G. 23

OPTICAL INFORMATION RECORDING MEDIUM AND METHOD FOR RECORDING INFORMATION ON SAID MEDIUM AND REPRODUCING INFORMATION THEREFROM

This application is a continuation of application Ser. No. 843,593 filed Mar. 25, 1986, now abandoned.

BACKGROUND OF THE INVENTION

The present invention relates to an optical information recording medium and a method for recording information thereon and reproducing information therefrom and more particularly an optical recording medium in the form of a card having tracking tracks for obtaining a tracking signal and a method for recording information thereon and reproducing information therefrom.

RELATED BACKGROUND ART

So far media for recording information and reproducing recorded information by light are in the form of a disk, a card, a tape and so on. Of these optical recording media, optical media in the form of a card (to be referred to as "an optical card" hereinafter in this specification) is considered to have a large demand because it is light in weight, compact in size and easy to handle and is capable of storing a large amount of information.

FIG. 2 is a schematic top view of an optical card of the type described above. Reference numeral 101 designates a recording medium; 102, an information recording area, 103, information tracks; 104 and 104', track selection areas; and 105, the home position of a light beam.

The light beam which has been modulated in response to information to be recorded and focused into a fine spot scans the light card so that information which can be detected optically is recorded as a series of bits (information track). In order to correctly record information without causing any trouble such as intersections between information tracks, the scanning position of the light beam must be controlled in a direction the plane of the optical card and perpendicular to the scanning direction (auto tracking and referred to as "AT" hereinafter in this specification). Furthermore, in order to secure the stable scanning by the fine light spot even when the optical card is bent and has some mechanical errors, the scanning light spot must be controlled in,,the direction perpendicular to the plane of the optical card (auto focusing and referred to be as "AF" hereinafter in this specification).

In the case of the reproduction mode, the above described AT and AF are needed.

FIG. 1 shows an optical card recording reproducing device. Reference numeral 106 designates a motor for displacing an optical card in the directions indicated by the double-pointed arrows, 107, a light source such as a semiconductor laser; 108, a collimator lens; 109, a beam splitter; 110, an objective lens; 111, a tracking coil; 112, a focusing coil; 113 and 114, condenser lenses; 115 and 116, photoelectric transducers; 117, a tracking control circuit; and 118, a focusing control circuit. AT and AF can be accomplished by causing an electric current to flow through the tracking and focusing coils 111 and 112.

Referring next to FIG. 2, the recording and reproduction nodes will be described. Initially, the light beam is maintained at the home position 105 and then it is shifted in the direction u in the track selection area to find a track N into which is stored information or from which information is read out. Next AT and AF are activated and the light beam scans the track N in the direction r for recording or reproduction. When the light beam enters the track selection area 104', a large current instantaneously flows through the tracking coil 111 as shown in FIG. 1 so that the light beam is kicked back to the track N+1 and then scans it in the direction 1 for recording or reproduction. In response to the amount of information, this kicking operation is repeated several times. In this specification, the term "kicking" refers to the movement of the light beam from the track it is tracking to the adjacent track or a track spaced apart from the track which is being scanned by the light beam in an optical pickup device having an autotracking mechanism.

The track-pitch of the optical card is by far greater than that of the optical disk and is in general of the order of 20–40 $\mu$m. In order to cause the light beam to kick such large pitch, an excessive current must be supplied to the AT coil so that there arise the problems of coil burnout and kick miss. Furthermore, when the light beam is deviated from its tracking track due to the kick miss or the like, it is not easy to reestablish the tracking control.

Next the method for recording information on an optical card and reproducing it therefrom will be described in more detail hereinafter. FIGS. 3A and 3B are views used to explain the optical card recording and reproducing method disclosed based on the technical agreement between the same assignee and Drexler Technology Corporation, U.S.A. FIGS. 3A and 3B show the relationship between an array of tracks on the optical card and the spot of the light beam projected upon the optical card for recording or reproduction. FIG. 3A shows the positional relationship between the beam spot and tracks in the recording mode. Reference numerals 121, 122 and 123 are tracks for obtaining the tracking signal and the clock signal; and 124 and 125, information tracks into which is recorded information. The information track 124 is shown as having information bits 126 already recorded while the information track represent beam spots, respectively, simultaneously projected on the optical card by a device (not shown) and the positional relationships among these beam spots are maintained constant. The beam spots are so arranged as to project different tracks, respectively. That is, while the beam spots 127 and 129 scan the clock and tracking tracks 121, 122 and 123 so that the information required for controlling the positions of the beam spots is obtained, the beam spot 128 records the information bits 126 on the information tracks 124 and 125. In this case, it should be noted that the auto-focusing signal is also obtained from the beam spots 127 and 129 and that even though FIG. 3A shows two groups of beam spots 127, 128 and 129, the optical card does not receive a plurality of groups of beam spots simultaneously.

FIG. 3B shows the relationship between the light beam spots 127, 128 and 129 and the tracks on the optical card in the reproduction mode. In the reproduction mode, the central light beam spot 128 is guided by the clock and tracking track 122 and the two beam spots 127 and 129 scan the recorded information tracks 124 and 125 adjacent to the clock and tracking track 122, thereby reproducing the recorded information. In this case, it should be noted that the auto-focusing signal is obtained from the light flux of the light beam spot 128.

The above-described beam spots are obtained by dividing a light beam from a single light source such as a laser into a plurality of light beams by grating means. For instance, the central beam spot 128 is the zero-order diffracted light while the beam spots 127 and 129 are the ±first-order diffracted light, respectively. Then, in general, the intensity $I_8$ of the beam spot 128 is greater than the intensities $I_7$ and $I_9$ of the beam spots 127 and 129 and $I_7 = I_9$. In the recording or reproduction mode, the intensities of the beam spots are so determined as to satisfy the following conditions. That is, in the reproduction mode the beam spots 127 and 129 can have sufficient reproduction outputs while the intensity of the beam spot 128 is selected less than the recording sensitivity of the optical card. In the recording mode, however, the intensity of the beam spot is so selected that it can record information on the optical card while the intensities of the beam spots 127 and 129 are so selected that they are less than the recording intensity of the optical card. It should be noted that the recording sensitivity varies depending upon a relative displacement speed between the recording beam and the optical card. For instance, when the relative displacement velocity is slow, the sensitivity becomes becomes possible to record information with a light beam with a low intensity. As a result, the relative velocity between the recording light beam and the optical card in the recording mode is different from that in the reproduction mode, the recording sensitivity is different between the recording and reproduction modes.

The optical card is in straight lines reciprocated in the directions indicated by the arrows F and G in FIGS. 3A and 3B. Of course, there arises no problem at all when each light spot is shifted on the optical card which is maintained stationary. It is assumed hereinafter that the optical card is shifted. It is not preferable that the optical card is always made to reciprocate when no information is recorded thereon or read out therefrom because since power is required for reciprocating the optical card, noise is produced upon the reciprocation of the optical card and the service life of the recording reproducing device is shortened.

However, when no information is recorded or read out so that the optical card is maintained stationary for a long period of time, the recording sensitivity of the optical card becomes high as described above. As a result, even when the light spot is maintained stationary at a position outside the information recording area or region, undesired information is recorded at the position at which the light spot is maintained stationary. Even though undesired information is recorded outside the information recording area or region, there is a possibility that this undesired information recorded will adversely affect other recording. For instance, the information tracks 124 and 125 are accessed by displacing an optical head and a recording medium in the direction perpendicular to the tracks. In this case, when a method for counting the number of tracks traversed by the light spot in the non-recording region into which are extended the tracks is employed in order to detect the displacement, the above-described erratically recorded undesired information is also read out, resulting in the error in counting.

SUMMARY OF THE INVENTION

The present invention was made to overcome the above and other problems encountered in the related art optical recording media and has for its object to provide an optical information recording medium capable of the stable recording and reproduction and a method for recording information thereon and reproducing the recorded information therefrom.

In an optical information recording media of the type in which a light beam scans each of a plurality of mutually parallel tracking tracks so that information is recorded or read out, the above and other objects of the present invention are realized by the fact that an auxiliary track which makes an angle $\theta$ with respect to each of the tracking tracks is provided in such a way that the following condition is satisfied:

$$0 \leq \theta \tan^{-1} 2Fx/v$$

where V is the scanning speed of a light beam;
F is the response frequency of the tracking tracks; and
x is the tracking amplitude at the frequency F.

When information is recorded or reproduced by projecting a plurality of beam spots on the optical information recording medium of the type described above and if the beam spot is located outside the information region of the optical information recording medium, undesired information can be prevented from being recorded on the optical information recording medium by obtaining the tracking signal from the beam spot which has the largest quantity of light.

BRIEF DESCRIPTION OF THE DRAWINGS

FIG. 11 is a view used to explain the relationship between the angle of inclination of an auxiliary track and the mode of operation of tracking means;

FIG. 12 is a view used to explain the mode of reproducing the recorded information by using the device as shown in FIG. 5;

FIGS. 14–19, 20A and 20B are schematic top views illustrating various embodiments of the optical card in accordance with the present invention;

FIG. 22 is a schematic top view illustrating a further embodiment of the optical card in accordance with the present invention; and FIG. 23 is a circuit block diagram of a device for recording information on and reproducing the recorded information from the optical card as shown in FIG. 22

DESCRIPTION OF THE PREFERRED EMBODIMENTS

Figure 1:
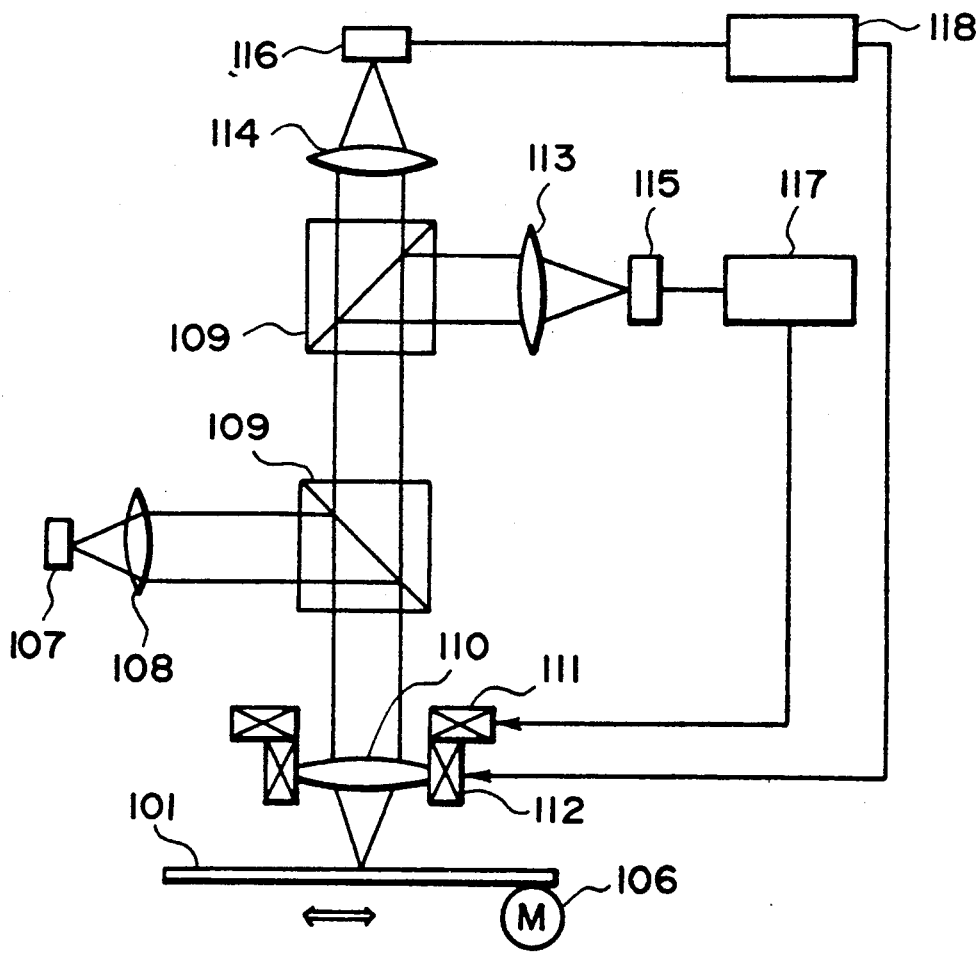
FIG. 1 is a schematic view used to explain the mode of operation of a prior art optical card recording-reproducing device.
Figure 2:
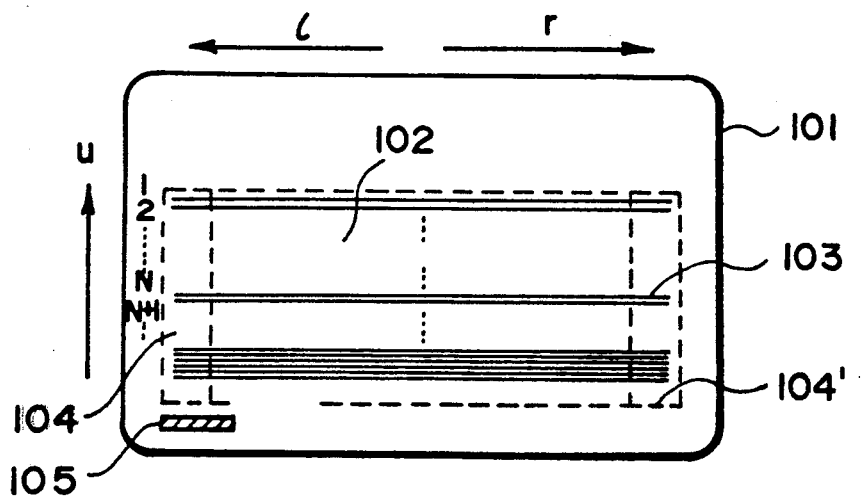
FIGS. 2, 3A and 3B are schematic top views of optical cards used to explain the methods for recording information on and reproducing information from the related optical cards.
Figure 3A:
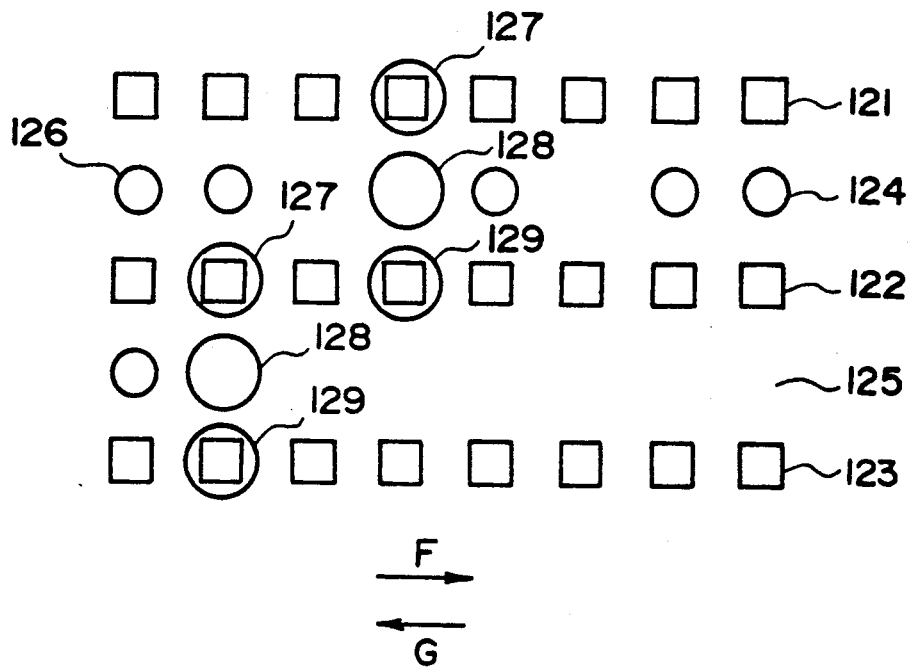
Figure 3B:
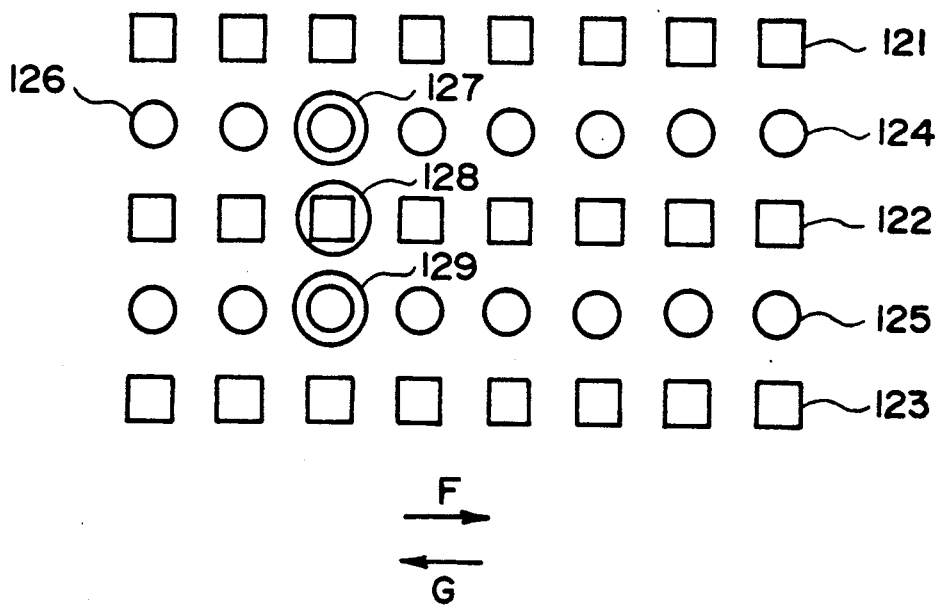
Figure 4:
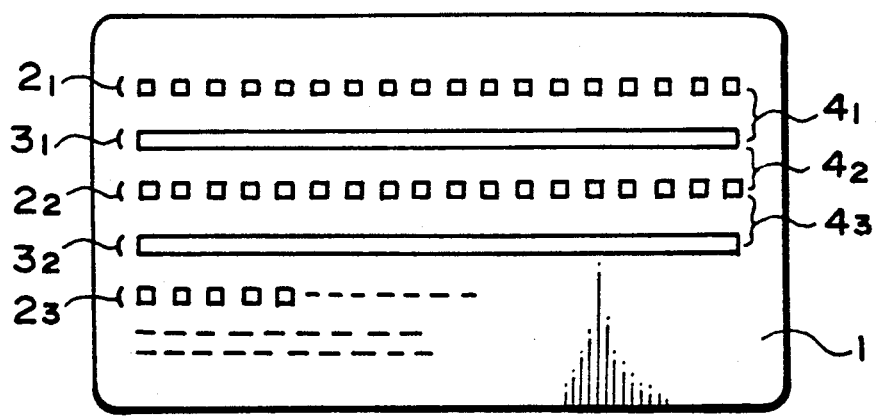
FIG. 4 is a schematic top view of an optical card in accordance with the present invention.

FIG. 4 is a schematic top view of an optical card in accordance with the present invention. The optical card 1 has clock tracks $2_1, 2_2, 2_3, \ldots$ each in the form of broken lines and each recording the clock signals and tracking tracks $3_1, 3_2, 3_3, \ldots$ each in the form of a continuous line. The clock tracks 2 and the tracking tracks 3 are alternately disposed distance. Recording portions $4_1, 4_2, 4_3, \ldots$ for recording information are defined in the spaces between the clock tracks 2 and the tracking tracks 3. That is, the optical card 1 has the recording portions in all the spaces between the clock track 2 and the tracking tracks 3.

Figure 5:
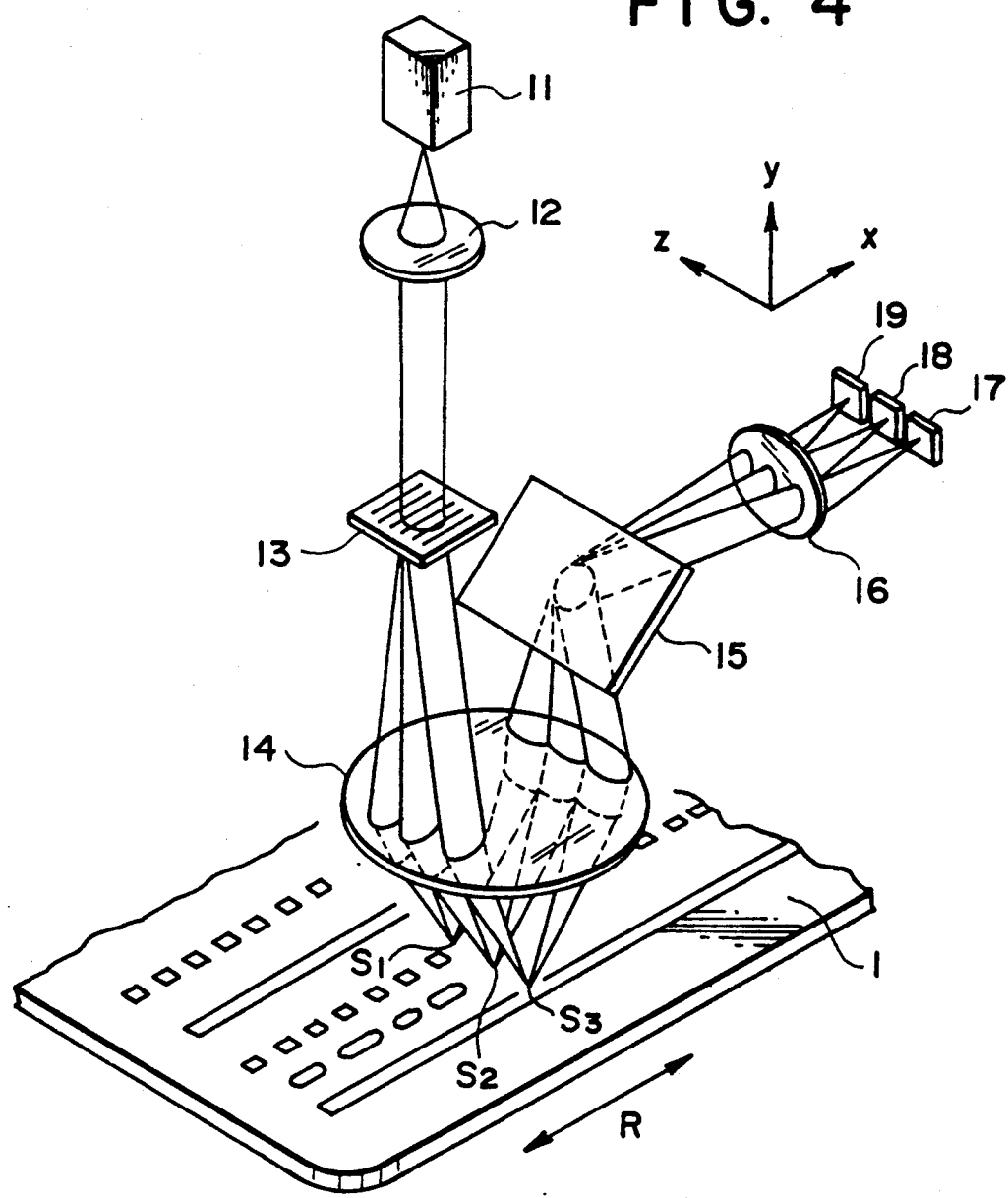
FIGS. 5 and 6 are schematic views illustrating a preferred embodiment of a device for recording information on and reproducing the recorded information from the optical information recording medium in accordance with the present invention.
Figure 6:
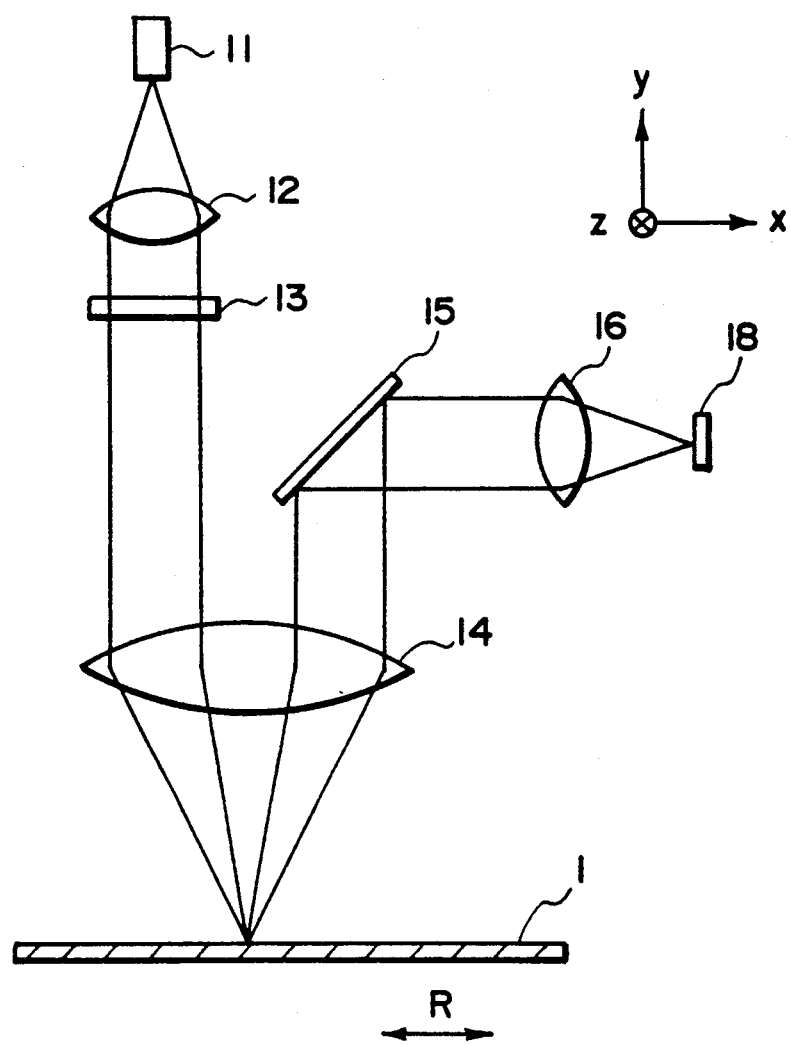

FIGS. 5 and 6 are views used to explain the construction of an optical information recording reproducing device adapted to recording information on and reproducing the recorded information from the optical card in accordance with the present invention. FIG. 5 is a perspective view while FIG. 6 is a vertical sectional view. The light beam emitted from a light source such as a semiconductor laser 11 is made parallel by means of a collimator lens 12 and split 15 into three beams by a diffraction grating 13. These beams are focused through an objective lens 14 upon the optical card 1 as shown in FIG. 4, thereby forming beam spots $s_1, s_2$ and $s_3$. The optical card 1 is reciprocated in the directions indicated by the double pointed arrows R by means of a driving device (not shown) so that the beam spots s scan in the directions in which the tracking tracks and the clock tracks are extended.

Figure 7:
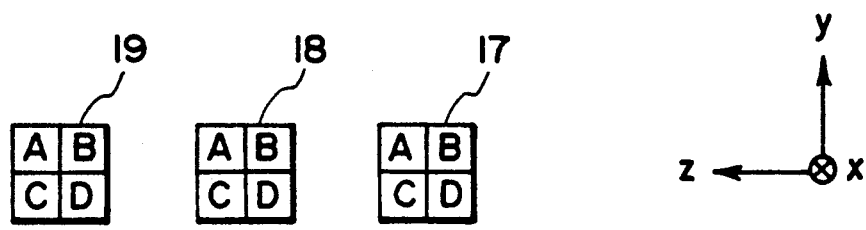
FIG. 7 is a view illustrating the arrangement of photodetectors in the recording-reproducing device as shown in FIG. 5.

The reflected light beams of the beam spots $s_1, s_2$ and $s_3$ pass through the objective lens and are reflected by a mirror 15 and focused through a condenser lens 16 on photodetectors 17, 18 and 19 placed on the focal plane of the condenser lens 16 in the direction z as shown in FIG. 7. The light receiving surface of each of the photodetectors 17, 18 and 19 are divided into four sections as indicated by A, B, C and D.

Figure 8:
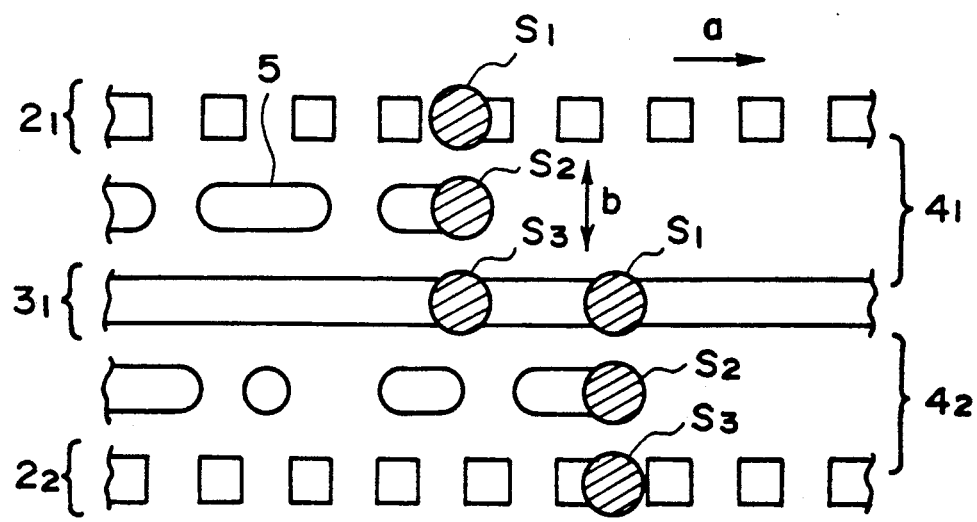
FIG. 8 is a view used to explain the mode of recording information by using the device as shown in FIG. 5.

Referring next to FIG. 8, the method for recording information on the optical card by using the device of the type described above will be described. FIG. 8 shows the recording surface, on enlarged scale, of the optical card. First, in the case of recording information on the recording portion $4_1$, the light spots $s_1, s_2$ and $s_3$ are focused on the clock track $2_1$, the recording portion $4_1$ and the tracking tracks $3_1$, respectively. As described above, the optical card 1 is displaced so that these light spots scan in the direction a. The reflected light from the spot $s_1$ is incident on the light detector 17 so that the clock signal is reproduced. The reflected light from the light spot $s_3$ is incident on the photodetector 19 so that the tracking signal is detected by the so-called push-pull method. The light receiving surface of each photodetector faces in the direction y corresponding to the direction in which is extended the tracking track as shown in FIG. 4 and is divided into A and C; and B and D. As a result, if the light spot $s_3$ is deviated from the tracking track $3_1$, there is a difference in intensity between the light beams incident on A and C; and B and D so that the tracking signal is obtained by comparing the signals obtained from these light receiving surfaces. In response to the tracking signal thus obtained, tracking means (not shown and for instance means adapted to cause the objective lens 14 to move in the direction Z in FIG. 5) causes the simultaneous movement of the spots $s_1, s_2$ and $s_3$ in the direction (b) perpendicular to the scanning direction, where AT is accomplished. Then recording pits 5 are correctly recorded along the tracking track $3_1$ in the recording portion $4_1$.

Figure 9:
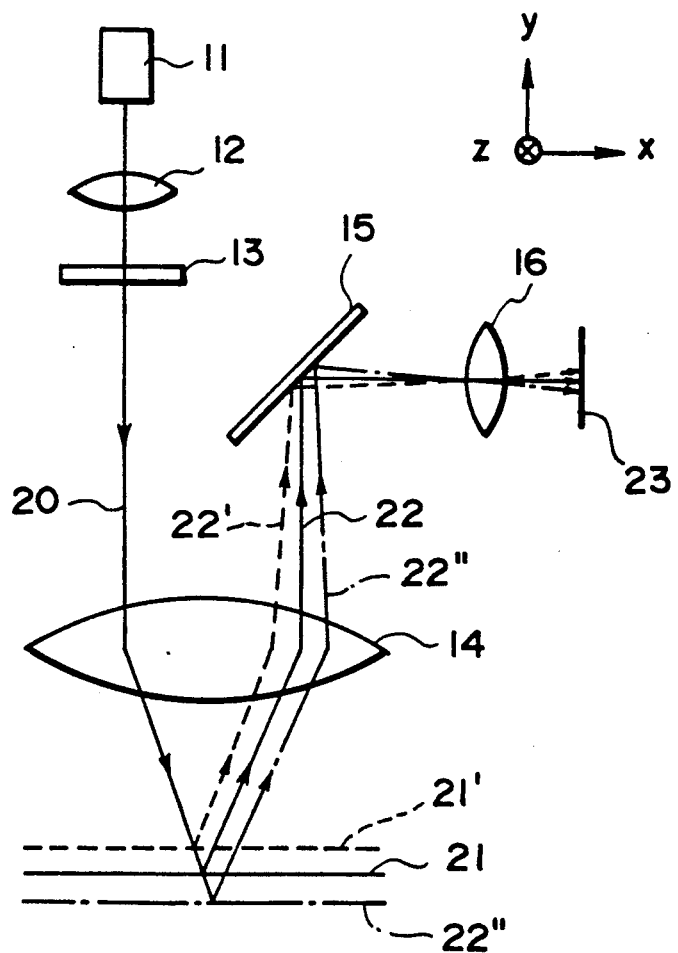
FIG. 9 is a view used to explain the principle for detecting the focusing signal in the device as shown in FIG. 5.

Furthermore, in the recording mode, simultaneous with AT, the photodetector 19 detects the focusing signal which controls the light spot in such a way that the light spot is correctly focused on the recording surface of the optical card. The principle for detecting the focusing signal will be, described briefly with reference to FIG. 9. Like reference numerals are used to designate similar parts in FIGS. 6 and 9 and no detailed explanation shall be made. The incident light beam 20 which forms the light spot $s_2$ is obliquely incident on the recording surface 21 of the optical card and if the light spot is correctly focused on the recording surface, the reflected light 22 is in parallel with the incident light 20 and is incident on the mirror 15 so as to be redirected toward a detecting surface 23. However, when the recording surface is shifted upwardly or downwardly as indicated by 21' and 21", the reflected light beam 22' or 22" is not in parallel with the incident light beam 20 and is focused on the detecting surface 23 at a position deviated in the direction y. The variation in light intensity in the direction y is detected in terms of the difference in output between the light receiving surfaces A and B; and C and D of the photodetector 19, whereby the focusing signal is obtained. In response to the focusing signal thus obtained, the objective lens 14 is shifted in the direction of the optic axis, whereby AF is accomplished.

Figure 10A:
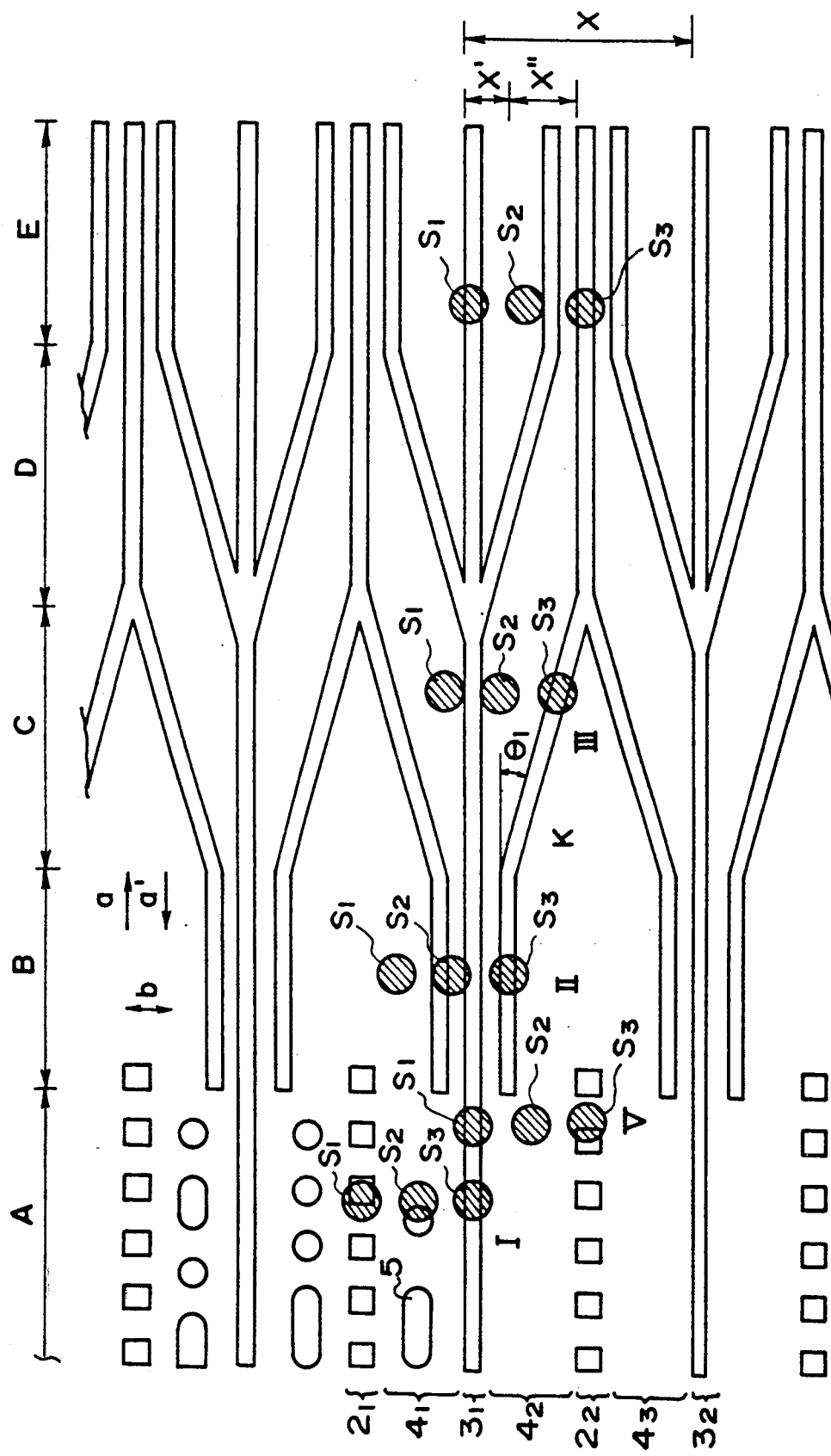
FIGS. 10A and 10B are schematic top views illustrating the features of an optical information recording medium in accordance with the present invention.

Referring next to FIG. 10A, one of the most important features of the optical information recording medium in accordance with the present invention will be described. FIG. 10A shows the right end portion, on enlarged scale, of the optical card 1 as shown in FIG. 4 and corresponds to the extension of the right side portion of FIG. 4. Like reference numerals are used to designate similar parts in FIGS. 4 and 10A and no detailed explanation shall be made in this specification.

In the recording mode, the light beams move in the direction indicated by the arrow a in FIG. 10A. The light spot $s_3$ accomplishes tracking while the light spot $s_2$ records information (at the position I in FIG. 10A). When the beam spots move out of the recording region A, they enter the kick region B in which the tracking tracks are extended in parallel with each other and the auxiliary tracks K are spaced apart a distance X' from the tracking tracks and are in parallel with the tracking tracks. Then tracking means (not shown and for instance means for displacing the objective lens in the dirction Z in FIG. 5) causes the beam spots to move by a distance X' in the direction b so that the beam spot $s_3$ tracks the auxiliary track K (at the position II in FIG. 10A). In this case, if the pitch X of the tracking tracks is of the order of 40 $\mu$m, the kick displacement X' may be 6-10 μm. The light spot s₃ movves along the auxiliary track K in the direction a into the region C.

In the region C, the auxiliary track K is included at an angle $\theta_1$ relative to the tracking track and under the tracking control by the beam spot s₃, the beam spots s₁, s₂ and s₃ move in the direction a while being displaced in the direction b (at the position III). In this case, the angle of inclination $\theta_1$ is dependent upon the relative displacement velocity V between the beam spot and the optical card, the response frequency F of tracking means (for instance, when the tracking is accomplished by the displacement of the objective lens, a critical frequency which ensures the displacement of the objective lens is F) and the tracking amplitude x at the frequency F. As shown in FIG. 11, the critical angle of inclination $\theta'$ at which no tracking failure occurs is given by $$\theta' + \tan^{-1} 2Fx/V$$

and the following condition must be satisfied $$\theta_1 \leq \theta'$$

Referring back to FIG. 10A, the light spot s₃ moves into the regions D and E (at the position IV) in which the auxiliary track is in parallel with the tracking tracks and is spaced apart from the adjacent tracking tracks $3_1$ and $3_2$ by the same distance (which corresponds to the distance between the beam spots s₁ and s₃). In this case, the functions of the signal processing systems of the photodetectors 17, 18 and 19 are switched so that AT and AF may be accomplished in response to the output signal from the photodetector 17 which receives the reflected light from the beam spot s₁ and that the clock signal may be reproduced in response to the output signal from the photodetector 19 which receives the reflected light from the beam spot s₃ as will be described in detail hereinafter. In the regions D and E, the auxiliary track K is spaced apart from the tracking track $3_1$ by the distance equal to the distance between the beam spots s₁ and s₃ as described above, the beam spot s₁ is located on the tracking track $3_1$ so that the above-described switching can be accomplished smoothly.

Thereafter the beam spots are moved back in the direction indicated by a' under the tracking control by the beam spot s₁. When they enter the region A', the recording of the information by the beam spot s₂ is started again (at the position V).

Next the mode of reproducing the information thus recorded by using the same device will be described with reference to FIG. 12. In FIG. 12, the information tracks $25_1$, $25_2$, ... each consisting of a linear array of recording bits are defined between the clock tracks $2_1$, $2_2$, ... and the tracking tracks $3_1$, $3_2$, .... The beam spots s₁, s₂ and s₃ scan the information track $25_1$, the tracking track $3_1$ and the information track $25_2$, respectively, in the direction a. While the photodetector 18 accomplishes AT and AF, the photodetectors 17 and 19 simultaneously read out the information from the information tracks $25_1$ and $25_2$, respectively. The above-described operation is repeated so that the information recorded on the whole region of the optical card can be read out at a speed twice as fast as a speed attained when only one information track is scanned. When the information tracks and the tracking track are scanned in the manner described above, no clock signal can be obtained from the clock track, but there arises no problem at all in practice because in the reproduction mode, the clocks can be obtained from the information recorded on the information tracks (the so-called self-clock).

Figure 10B:
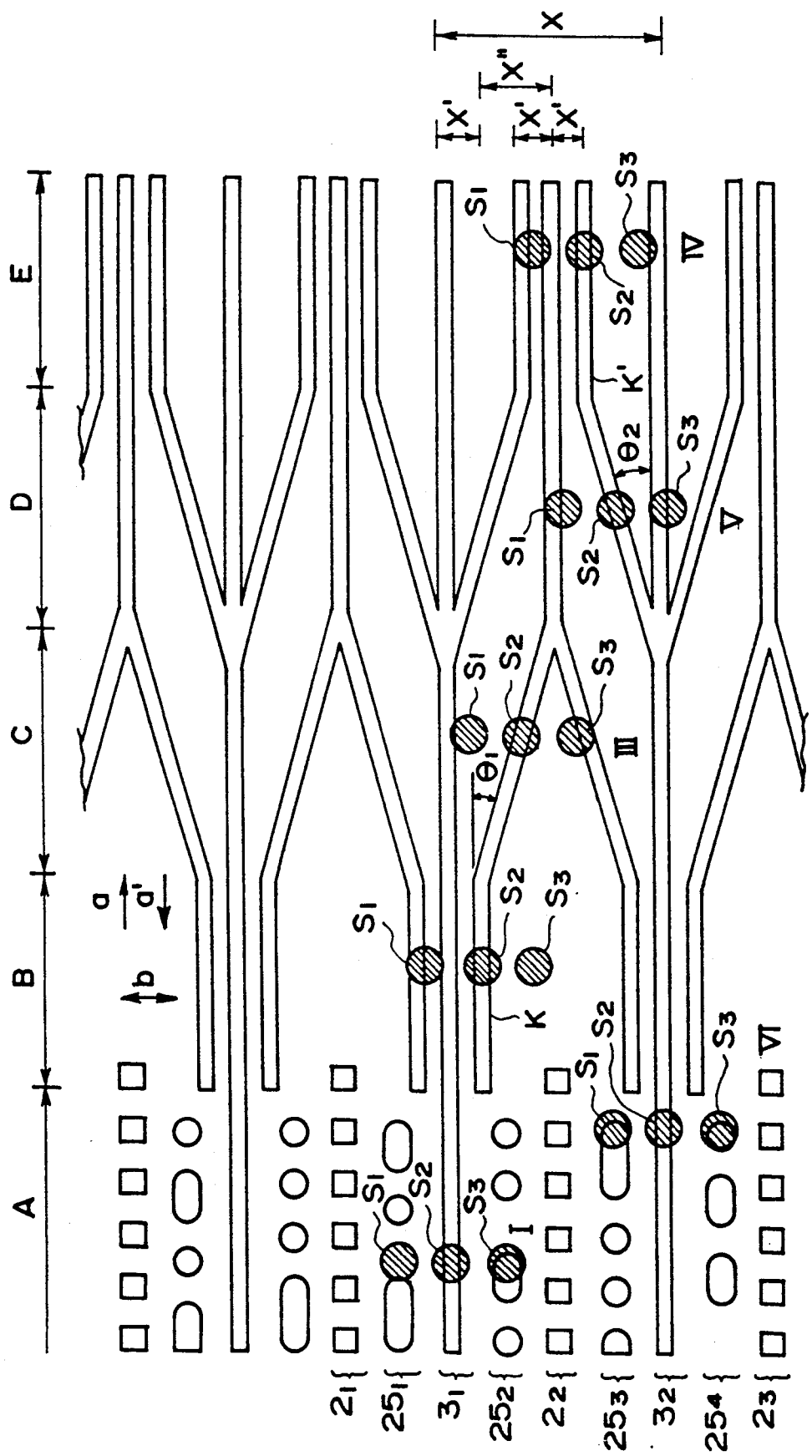

Referring again to FIG. 10B, the mode of reproduction will be described. FIG. 10B corresponds to the extension of the right side portion of the optical card having information recorded thereon as shown in FIG. 12. Like reference numerals are used to designate similar parts in FIGS. 10B and 12 and no detailed description shall be made in this specification.

In FIG. 10B, the beam spots are moved in the direction indicated by the arrow a so that the beam spot s₂ tracks the tracking track while the beam spots S₁ and s₃ reproduce the recorded information (at the position I). The beam spots leave the recording region A and enter the kick region B. In the region B, as in the case of the recording mode, the beam spots are kicked by a distance X' in the direction b so that the beam spot s₂ tracks the auxiliary track K (at the position II). Thereafter the beam spots pass the region C (at the position III) in which the auxiliary track K is inclined at an angle $\theta_1$ and enter the regions D and E in which the auxiliary track K is in parallel with the tracking track In the region E, the auxiliary track K' is in parallel with the tracking track and is spaced apart therefrom by a distance X" or X"+2X'. The beam spots are kicked in the direction b by a distance X' so that the beam spot s₂ tracks the auxiliary track K' (at the position IV). Thereafter the beam spots are moved back in the direction a' and enter the region D. In the region D, the auxiliary track K' is inclined at an angle $\theta_1$ relative to the tracking track and the following condition is satisfied:

$$\theta_1 \leq \theta',$$

(the critical angle of inclination),

Thereafter the beam spots move past the regions C and B and enter the region A in which the beam spots s₁ and s₃ read out the recorded information.

Figure 13:
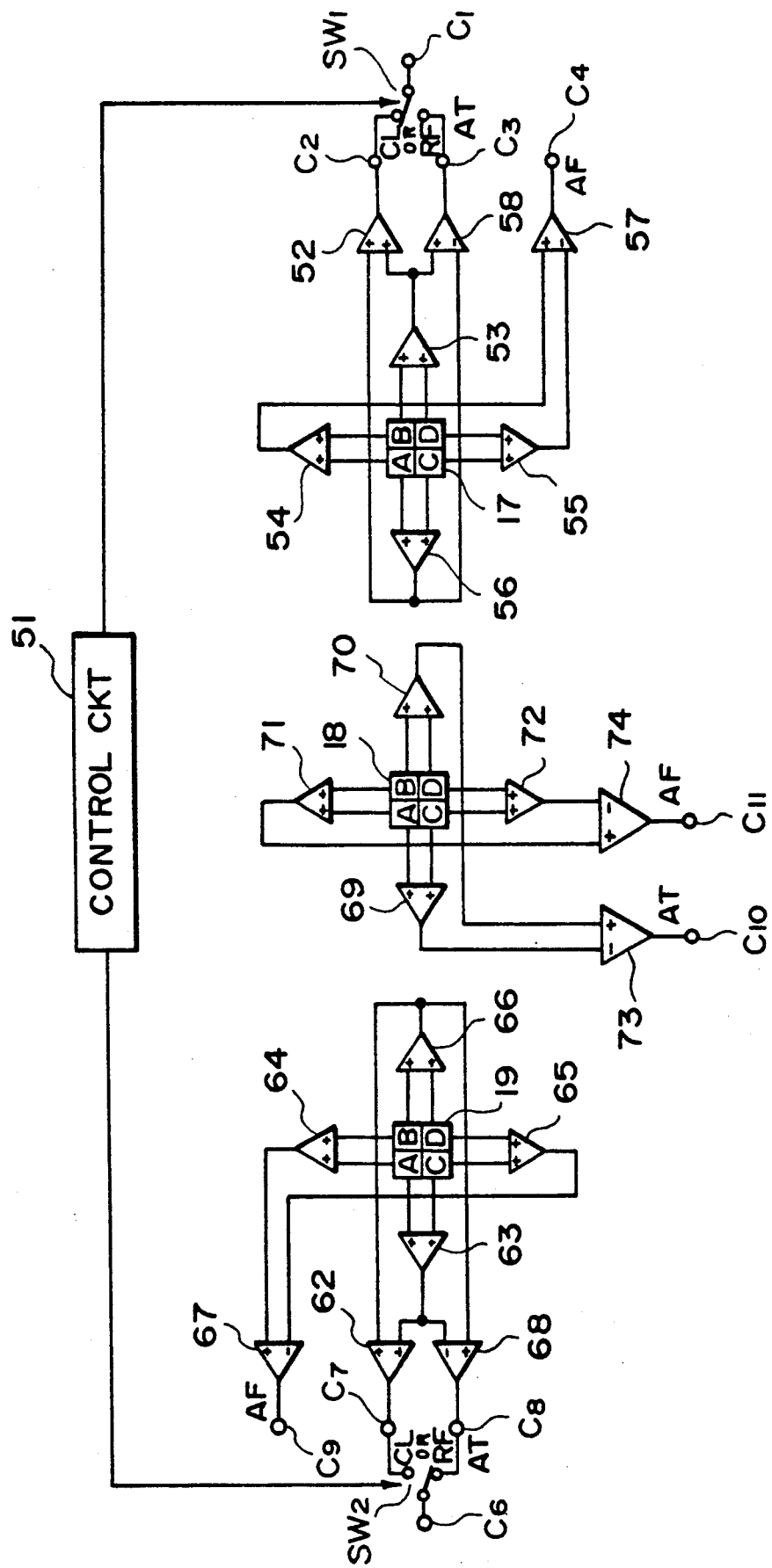
FIG. 13 is a block diagram of a signal detector in the device as shown in FIG. 5.

FIG. 13 is a block diagram of signal processing systems of the photodetectors 17, 18 and 19. Reference numeral 51 designates a control circuit for controlling switches SW1 and SW2; 52, 53, 54, 55, 56, 62, 63, 64, 65, 66, 69, 70, 71 and 72, summing amplifiers; 57, 58, 67, 68, 73 and 74, subtraction amplifiers; and $C_1$-$C_{11}$, terminals. In the case of recording information on the recording region $4_1$ as shown in FIG. 10A, the control circuit 51 causes the movable contact of the switch SW1 to contact with the terminal $C_2$ and causes the movable contact of the switch SW2 to contact with the contact C8. As a result, the sum of the outputs from the light recieving surfaces A, B, C and D of the photodetector 17 is derived through the summing amplifiers 53, 56 and 52 at the terminal Cl as the clock signal CL which in turn is transmitted through a processing circuit (not shown) so as to be used as a reference signal for controlling the beam spot s₂ in the case of recording. The difference between the sum of the outputs from the light receiving surfaces A and C of the photodetector 19 and the sum of the outputs from the light receiving surfaces B and D thereof is derived through the summing amplifiers 63 and 66 and the subtraction amplifier 68 at the terminal C6 as the tracking signal AT, which in turn is applied to a tracking servo circuit (not shown). The difference between the sum of the outputs from the light receiving surfaces A and B of the photodetector 19 and the sum of the outputs from the light receiving surfaces C and D thereof is derived through the summing amplifiers 64 and 65 and the subtraction amplifier 67 at the terminal C9 as the focusing signal AF, which in turn is applied to a focus servo circuit (not shown).

In the case of recording information at the recording region $4_2$, the control circuit 51 causes the movable contact of the switch SW1 to contact with the contact C3 and causes the movable contact of the switch SW2 to contact with the contact C7. Then the tracking signal AT is derived from the contact C1, the clock signal CL is derived from the contact C6; and the focusing signal AF is derived from the contact C4.

For instance, when an address signal for each track is previously recorded in the recording region, it is read out by the photodetector 18 so that in response to the address signal thus read out, the control circuit 51 determines the recording region to be scanned and the position of the tracking track (that is, which side of the recording region is located the tracking track) and switches itself.

Next in the reproduction mode described above with reference to FIG. 10B, in response to the mode selection signal applied from the exterior, the control circuit 51 is driven into the reproduction mode. As a result, the movable contact of the switch SW1 is made into contact with the contact C2 while the movable contact of the switch SW2 is made into contact with the terminal C7. Then, the difference between the sum of the outputs from the light receiving surfaces A and C of the photodetector 18 and the sum of the outputs from the light receiving surfaces B and D thereof is derived at the contact C10 as the tracking signal through the summing amplifiers 69 and 70 and the subtraction amplifier 73. The tracking signal AT thus obtained is applied to a tracking circuit (not shown). The difference between the sum of outputs from the light receiving surfaces A and B of the photodetector 18 and the sum of the outputs from the light receiving surfaces C and D thereof is derived through the summing amplifiers 71 and 72 and the subtraction amplifier 74 at the contact C11 as the focusing signal AF, which in turn is applied to a focus servo circuit (not shown). The reproduced signals RF read out by the photodetectors 17 and 19 are derived from the contacts C1 and C6.

It is to be understood that the present invention is not limited to the format described above and that the clock tracks and the tracking tracks may have any suitable positional relationships. The present invention may be equally applied to a format without clock tracks.

FIGS. 14-17 are schematic top views of various embodiments of the optical card in accordance with the present invention and show only the tracking tracks TN and TN+1 and the auxiliary tracks K1, K2, ..., and Kn. The shaded spots are displaced in the directions indicated by the arrows. In the region k, the kick operation is carried out so that the beam spot is displaced from the track TN to the track TN+1. The condition $\theta \leq \theta'$ (the critical angle of inclination) is satisfied. In the embodiments as shown in FIGS. 14 and 15, only the displacement of the beam spot from the track TN to the track TN+1 is permitted. In the embodiment as shown in FIG. 16, the angle of inclination $\theta$ is zero. In the embodiment as shown in FIG. 17, a number of n auxiliary tracks $k_1, k_2, \ldots$ and $k_n$ are extended in parallel with each other between the tracking tracks TN and TN+1 and the kick operation is repeated (n+1) times in the region k so as to cause the displacement of the beam spot.

Figure 18:
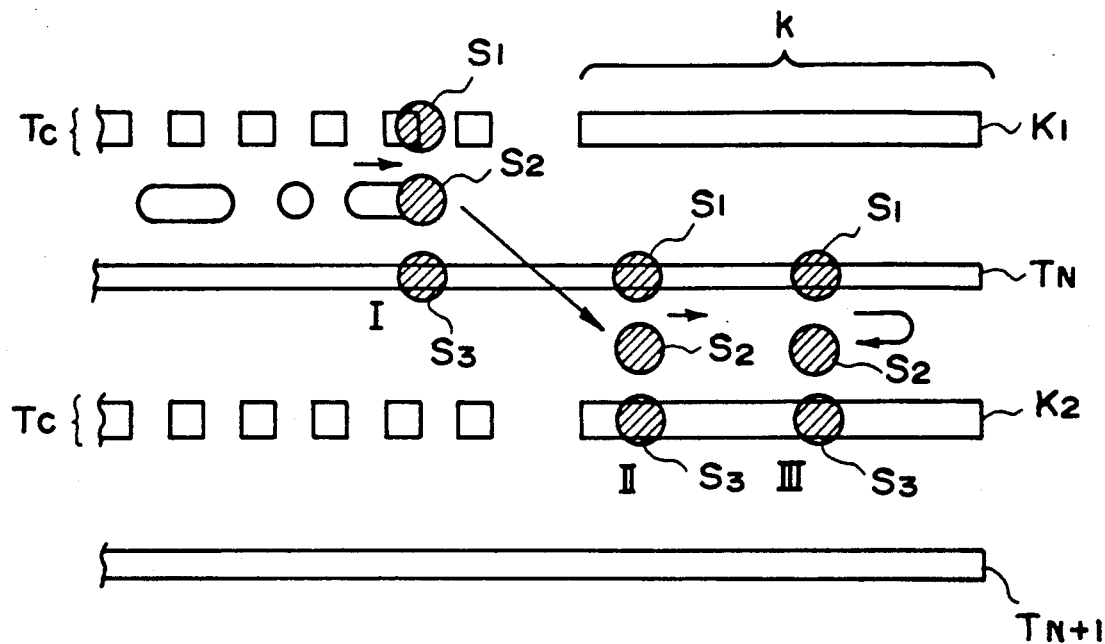
Figure 19:
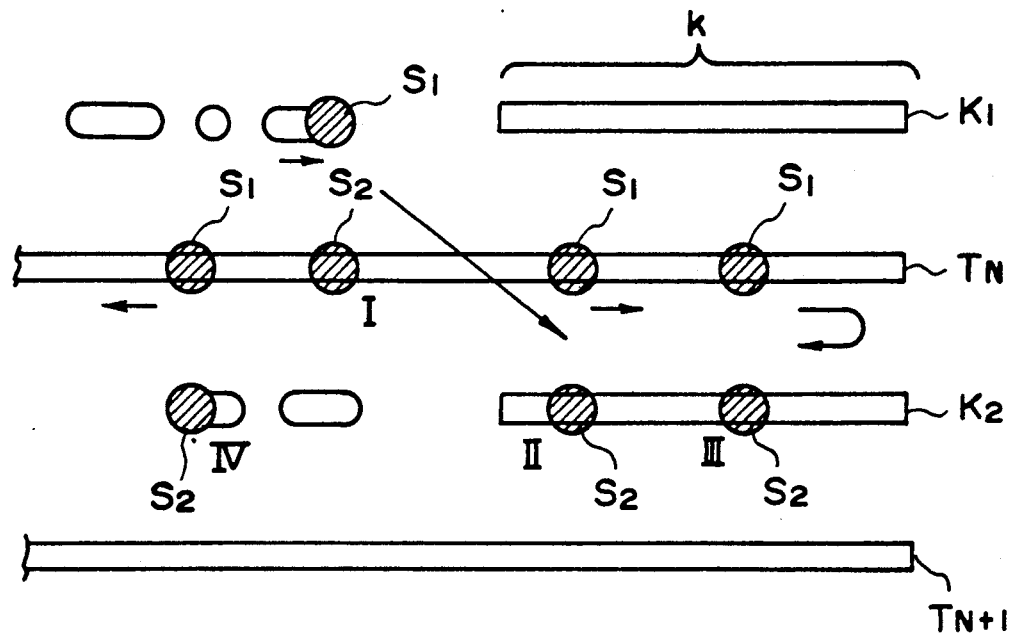

FIGS. 18 and 19 are schematic top views of the recording surfaces of the optical cards illustrating the mode of information recording when the format as shown in FIG. 16 is used. TN and TN+1 designate the tracking tracks; $K_1$ and $K_2$, the auxiliary tracks; Tc, the clock track; and $s_1$, $s_2$ and $s_3$, beam spots. In the case of the embodiment as shown in FIG. 18, the beam spot s reproduces the clocks and the beam spot $s_3$ tracks the tracking track while the spot $s_2$ records information at the position I. At the position II in the kick region b, the kick operation is carried out and at the position III, the beam spots are reversed in direction so that the beam spot $s_1$ detects the tracking signal. While the spot $s_3$ reproduces the clocks, the beam spot $s_2$ records information again.

Figure 20A:
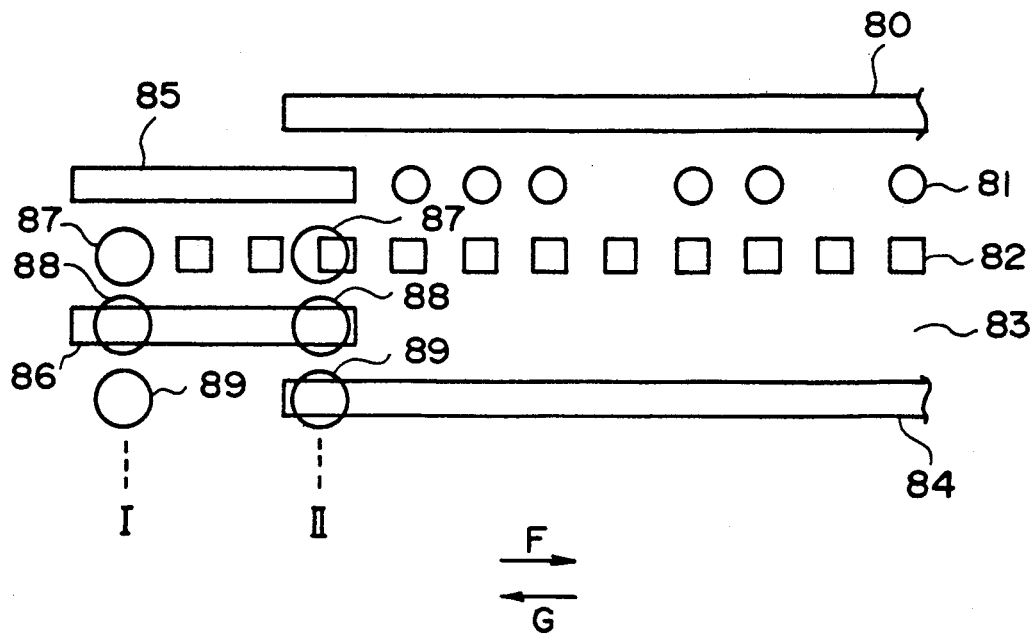

FIG. 20A is a view of a further embodiment of the optical card format in accordance with the present invention and shows the beam spots projected upon the optical card in the recording mode. Reference numerals 87, 88 and 89 represent a first, a second and a third beam spot, respectively, and the second beam spot 88 has the highest intensity and the intensity of the first beam spot 87 is substantially equal to that of the third beam spot 89. Reference numerals 80 and 84 are tracking tracks from which can be derived the tracking signal; 82, a clock track from which can be derived the clock pulses; and 81, an information track for recording information. Reference numerals 85 and 86 designate auxiliary tracks which are used to hold the beam spots at there correct positions, respectively, outside of the information recording region. In other words, the auxiliary tracks are the tracking tracks outside of the information recording region. The tracking tracks 80 and 84 and the auxiliary tracks 85 and 86 overlap each other adjacent to the information recording region. In this format, the auxiliary tracks 5 and 86 are extensions of the information tracks, respectively. The optical card is linearly reciprocated in the directions indicated by the arrows F and G. It is now assumed that in FIG. 20A the light spots 87, 88 and 89 are maintained stationary outside of the information recording region at the position I. Then, they are called in "the standing state" in this specification.

The intensities of the light spots 87, 88 and 89 are selected as described above and furthermore the intensity of the light spot 88 (having the highest intensity) is so selected that undesired recording will not be made even when the light spot 88 is focused at the same point for a long period of time in the "standing state" and that its intensity is high enough to attain stable tracking.

In the "standing state", the light spot 88 having the highest intensity is guided by the auxiliary track 86 so that the stable tracking is ensured and the automatic focusing servosystem is controlled. The present invention will be described hereinafter in terms of automatic tracking.

Figure 21:
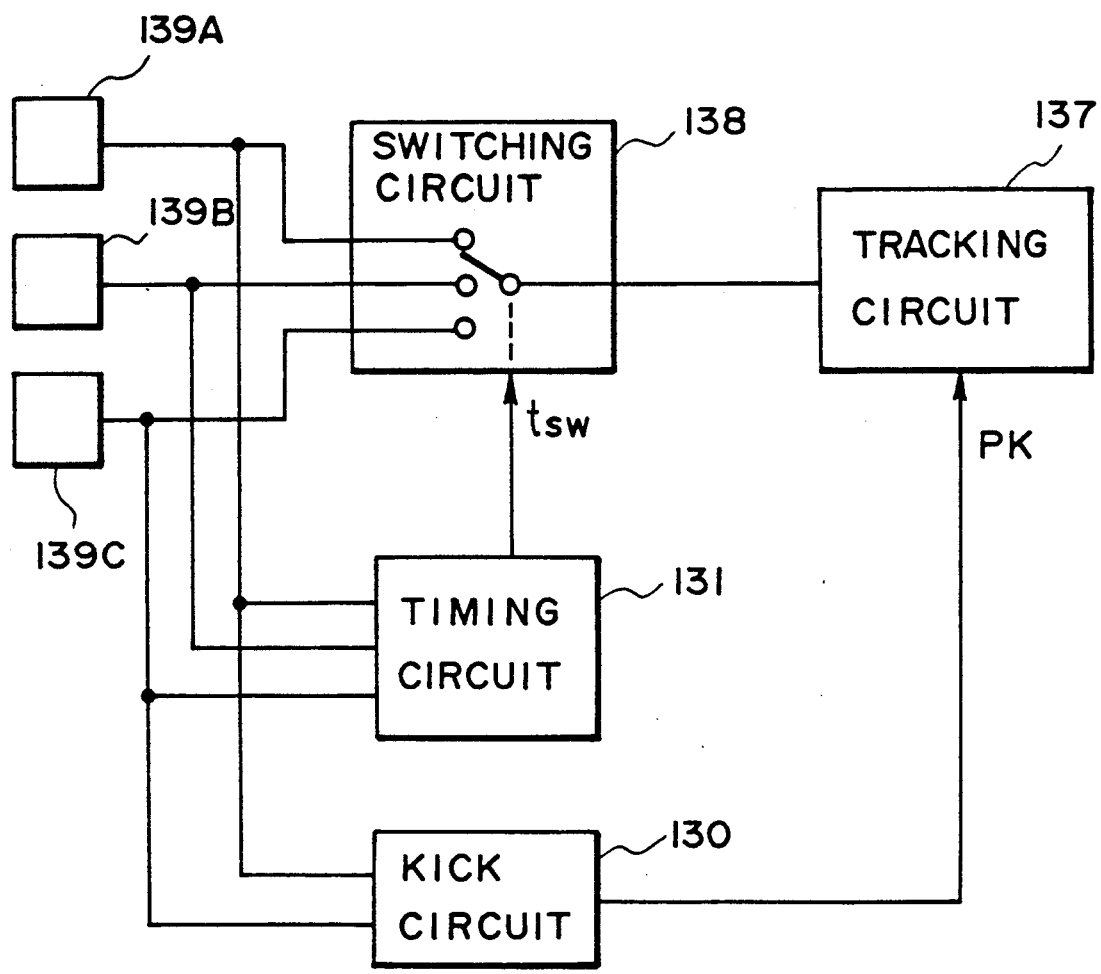
FIG. 21 is a block diagram of a circuit in a device for recording information on and reproducing the recorded information from the optical card as shown in FIGS. 20A and 20B.

The recording command is delivered from a controller (not shown). Then the optical card is shifted in the direction indicated by the arrow G so that the light spots 87, 88 and 89 are shifted from the position I to the position II. Simultaneously, the intensity of each light beam is increased until the sufficient clock signal is reproduced by the light spot 87 which scans the clock track. At the position II, the auxiliary track 86 and the tracking track 84 overlap each other. (The region in which the auxiliary track and the tracking track overlap each other is referred as "a relay zone" in this specification.) In the relay zone, the tracking light spot is switched from the light spot 88 to the light spot 89. This switching timing can be determined in response to the change in quantity of the light beam from the light spot 89 incident on a photosensor 139B as shown in FIG. 21. Depending upon an optical recording medium, the quantity of light incident on the photosensor 139B is increased or decreased and therefore cannot be specified. At the position I, the light spot 89 is not focused on the tracking track 84, but it is focused on the tracking track 84 at the position II. Therefore, the switching timing can be determined in response to the variation in quantity of light depending upon whether or not the light spot 89 is focused on the tracking track 84. Thereafter, tracking is attained by the light spot 89 which scans the tracking track 84 as a guide and the light spot 88 records information along the information track 83. The switching of the light spot for tracking will be described with reference to FIG. 21. The term "switching" means that a switching circuit 138 switches the input signal to a tracking circuit 137 from "from a sensor 139A corresponding to the light spot 88" to "from a sensor 139B corresponding to the light spot 89". A sensor 139C receives a light beam from the light spot 87. The switching signal tsw is generated in a timing circuit 131 in response to the variation of quantity of light incident on the sensor 139B and is applied to the switching circuit 138 so that a predetermined switching operation is carried out. In general, these sensors 139A, 139B and 139C are two-split sensors. The tracking system may be a conventional system known in the art as the one beam system, or push-pull system, a system for detecting a limit value or the like so that no further detailed description of the tracking system shall be made in this specification.

It should be noted that according to the present invention, each of the light spots 87, 88 and 89 can be split into three light beams so that tracking can be carried out based on the three-beam method disclosed in U.S. Pat. No. 3,876,842.

Figure 20B:
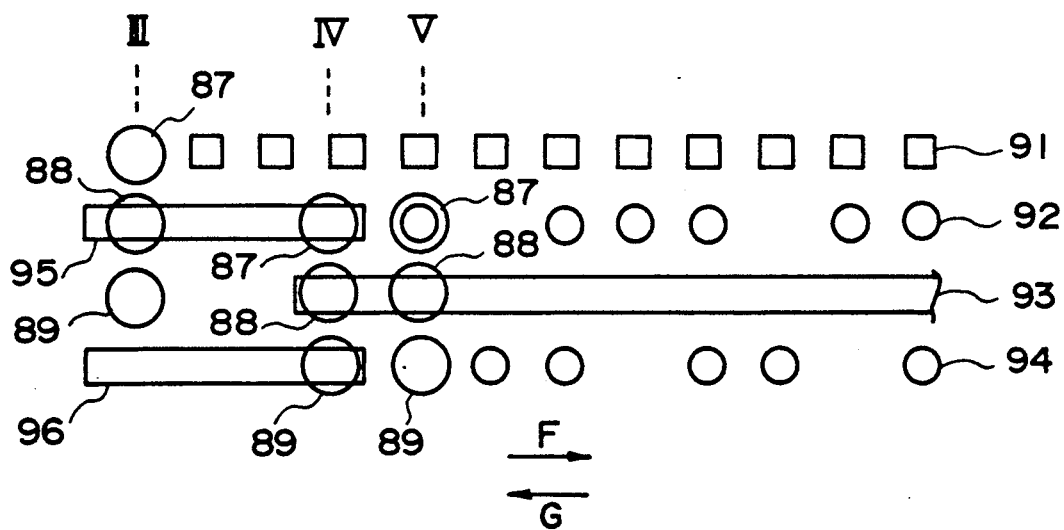

FIG. 20B shows the shift of the optical card as shown in FIG. 20A from the reproduction mode to the standing state. The light spots 87, 88 and 89 are same as those shown in FIG. 20A. Reference numeral 91 designates a clock track; 92 and 94, information tracks; 93, a tracking track; and 95 and 96, track bars.

In the reproduction mode, the optical card is shifted in the direction indicated by the arrow F. When the reproduction is carried out from the right side in FIG. 20B and in the case of the conventional reproduction mode in which the light spots are located at the position V in the information recording region, the light spot 88 scans the tracking track 93 as a guide while the light spots 87 and 89 simultaneously read out the information recorded along the information tracks 92 and 94, respectively. When the light spots are displaced to the position IV, the light spots 87 and 89 are focused at the auxiliary tracks 95 and 96, respectively, so that the quantity of light received by the sensors 139C and 139B from the light spots 87 and 89 varies so that the signals are generated. The output signal from the sensor 139C is applied to a kick circuit 130 which is similar to the circuit of a video disk or a compact disk. In response to this signal, a kick pulse Pk is applied from the kick circuit 130 to the tracking circuit 137 so that each of the light spots is caused to kick upwardly by a distance equal to the width of the track. Simultaneously, the output signal from the sensors 139B and 139C are also applied to the timing circuit 131 so that the signal tsw is applied from the timing circuit 131 to the switching circuit 138. As a result, the input signal to the tracking circuit 137 is switched from the sensor 139B corresponding to the light spot 89 to the sensor 139A corresponding to the light spot 88. Concurrently, the intensities of the light spots are decreased to the levels, respectively, in the standing state (I) prior to the starting of recording operation. As a result, the light spots 87, 88 and 89 are located at the positions indicated by III in FIG. 20B. The position III corresponds to the position I in FIG. 20A and the light spots are also maintained in the same states, respectively. At this time point, the light spots are maintained stationary. In practice, however, the fall time of a motor for driving an optical card is taken into consideration so that a controller (not shown) delivers a signal for stopping the optical card slightly before the light spots arrive at their standing state. As a result, the optical card is stopped at a predetermined position so that the light spots 87, 88 and 89 remain stationary at the position I. In this position, as in the case of the state before the recording operation, the stable tracking operation is ensured by the light spot which scans the auxiliary track 95 as a guide.

As described above, in the standing state, the intensity of the second light spot is so selected that it is sufficient for ensuring the stable tracking and that no undesired recording is made even when the second light spot remains at the same position for a long period of time. Such second light spot keeps tracking and when the second spot is needed for recording, the tracking light spot is switched to another light spot. In this case, as compared with the standing state, the intensities of all the light spots are increased as described so that the servosystem can be controlled in a stable manner by the first and second light spots 87 and 89.

When the vertical relationship between the tracking track and the clock track is reversed in FIGS. 20A and 20B, the switching operation is initiated in response to the variation of quantity of light incident on the sensor 139C and the abovedescribed operation is carried out except that the output from the sensor 139C is applied to the tracking circuit 137.

FIG. 22 shows a still further embodiment of the format of an optical card in accordance with the present invention. As in the case of the first embodiment as shown in FIG. 20A, reference numerals 87, 88 and 89 denote first, second and third light spots, respectively; 132 and 136, clock tracks; 133, an information track bearing no information; 135, an information track in which is recorded information; 134, a tracking track; and 134', an auxiliary track.

In the standing state, the light spots 87, 88 and 89 are maintained stationary at the position VI. In this state, the light spot 88 having the highest intensity is focused on the auxiliary track 134' so that stable tracking is ensured. When a controller (not shown) delivers a recording command, the optical card is shifted in the direction indicated by the arrow G and concurrently as in the case of the first embodiment, the intensity of each light spot is increased while the light spots 87, 88 and 89 are relatively shifted from the position VI to the position VII. At the position VII, the auxiliary track 134' is terminated so that, as described with reference to the first embodiment, the quantity of light incident from the light spot 88 on a sensor 147B (See FIG. 23) varies so that the sensor 147b generates a signal, which in turn is applied to a kick circuit 149. Then, in response to this input signal, the kick circuit 149 applies a kick pulse Pk to a tracking circuit 141 so that the light spots 87, 88 and 89 are kicked upwardly in FIG. 22. Concurrently the signal from the sensor 147b is applied to a timing circuit 148 so that a timing pulse tsw is applied from the circuit 148 to a switching circuit 140 and the input to the tracking circuit 141 is switched from the output signal from the sensor 147B corresponding to the light spot 148 to the output signal from a sensor 147A corresponding to the light spot 89. As a result, the light spots 87, 88 and 89 are arranged as shown at the position VIII. Thereafter, while the light spot 89 scans the tracking track 134 as a guide, the light spot 88 records information bits along the information track 123. The distance between the tracking track 134 and the auxiliary track 134' is substantially equal to the diameter of the light spot (in general, a few micrometers), it will not adversely affect the band of the tracking servosystem when the displacement velocity (depending upon a system used and in general of the order of tens mm/sec - hundreds mm/sec) of the optical card is taken into consideration. In this embodiment, the switching of the light spots is not effected in order to obtain tracking.

So far the present invention has been described only in conjunction with the automatic tracking, but it is to be understood that the present invention is not limited thereto. For instance, the light spot which is used for establishing tracking may be simultaneously used for effecting automatic focusing. Furthermore, the light spot may be used only for attaining automatic focusing.

As in the case of the automatic tracking system, the automatic focusing servosystem may be any suitable servosystem such as an astigmatism system, a knife edge system or the like employed in the conventional video disk and compact disk so that no detailed description thereof shall be made in this specification.

So far the light spots have been described as being kicked upwardly, but it is to be understood that they may be kicked downwardly. Furthermore, depending upon the automatic focusing system and the automatic tracking system used in practice, two-split or four-split type sensors are used, but in this embodiment they have been explained as consisting of a unitary construction. In addition, both the recording and reproduction modes have been described as being carried out at the left side of the optical card, but it is to be understood that the recording and reproduction operations may be equally carried out at the right side or both sides of the optical card by switching the spots in the manner described above.

In the embodiments described above with reference to FIGS. 20A-23, prior to the recording or reproduction operation and/or after the recording or reproduction operation, of a plurality of light spots, the automatic tracking light spot and/or the automatic focusing light spot is so switched that its intensity is sufficiently high enough to ensure the stable servo operation and that its intensity is not sufficient enough to record undesired information even when the light spot is focused at the same point for a long period of time. As a result, the stable operation of the servomechanism can be ensured and no undesired recording is made at all even when the light spot is focused at the same point for a long period of time on the optical card.

It is to be understood that the present invention may be equally applied to other fields in addition to the above-described embodiments.

We claim:

1. An optical information recording medium comprising:

a plurality of parallel tracking tracks preformed on a surface of the medium, wherein a tracking signal can be detected by scanning a light beam along at lest one of said tracking tracks;

an information recording region for storing information provided in an area between said tracking tracks; and a kick region for instructing the light beam to move to one of said plurality of tracking tracks adjacent to said at least one tracking track provided at both endmost portions of said at least one tracking track.

2. A method of recording or reproducing information on or from an information recording region on an optical information recording medium which includes a plurality of parallel tracking tracks preformed on a surface of the recording medium, said method comprising:

recording or reproducing information from the information recording regions provided between the plurality of tracking tracks;

detecting a tracking signal by scanning a light beam along one of the tracking tracks formed on the recording medium while recording or reproducing the information in said recording or reproducing step; and moving the light beam to one of the plurality of tracking tracks adjacent to the one tracking track, said moving step instructed by a kick region located at both endmost portions of the tracking track.

3. An optical information recording medium having a recording surface provided with a plurality of tracking tracks and information tracks in parallel with one another and divided in a longitudinal direction of the tracks into a first region and a second region, said medium comprising:

a plurality of parallel tracking tracks provided in the first and second regions, each of said tracking tracks being continuous;

a plurality of information tracks provided in the first region only and between said tracking tracks in a widthwise direction of said tracking tracks, said information tracks being capable of having information recorded thereon by irradiating said information tracks with a light beam; and a plurality of auxiliary tracks provided in the second region only and between said tracking tracks in the widthwise direction of said tracks at least a part of said auxiliary tracks being parallel to said tracking tracks.

4. An optical information recording medium according to claim 3, further comprising a plurality of clock tracks for generating clock signals provided in the first region only and between said tracking tracks in the widthwise direction of said tracks.

5. A method of recording or reproducing information onto or from an optical information recording medium having a recording surface provided with a plurality of tracking tracks and information tracks in parallel with one another and divided, in a longitudinal direction of the tracks, into a first region and a second region, the optical information recording medium including a plurality of parallel tracking tracks provided in the first region and in the second region, each of the tracking tracks being continuous, a plurality of information tracks provided in the first region only and between the tracking tracks in a widthwise direction of the tracks, the information tracks being capable of having information recorded thereon by irradiating said information tracks with a light beam and a plurality of auxiliary tracks provided in the second region only and between the tracking tracks in the widthwise direction of the tracks, at least a part of the auxiliary tracks being parallel to the tracking tracks, said method comprising the steps of:

a first detecting step for detecting tracking signals by a first light beam by scanning a first tracking track with the first light beam in the first region;

recording or reproducing information by a second light beam by scanning a first information track with the second light beam in the first region, while detecting the tracking signals in said detecting step;

moving the fist light beam from the first tracking track to an auxiliary track, adjacent to the first tracking track, in the second region;

moving the first light beam from the auxiliary track to a second tracking track in the second region;

a second detecting step for detecting tracking signals by the first light beam by scanning the second tracking track with the first light beam in the first region; and recording or reproducing information by the second light beam by scanning a second information track with the second light beam in the first region, while detecting the tracking signals in said second detecting step.

6. An optical information recording medium according to claim 3, wherein said auxiliary track is spaced apart from each of adjacent tracking tracks by the same distance.

7. An optical information recording medium according to claim 6, further comprising clock tracks for generating clock signals, said clock tracks extending along said information recording regions and between adjacent tracking tracks, said clock tracks being spaced apart from said information recording tracks and said tracking tracks by the same distance.

8. An optical information recording medium according to claim 3, wherein said auxiliary track further includes a part which forms a non-zero finite angle $\theta$ relative to said tracking track.

9. An optical information recording medium according to claim 8, wherein said angle $\theta$ satisfies the condition:

$$\theta \leq \tan^{-1} 2Fx/V$$

where V is the velocity of a light beam which is scanned on said recording medium, F is the response frequency in tracking of the light beam, and x is the tracking amplitude at the frequency F.

10. An optical information recording medium according to claim 8, wherein said auxiliary track includes a first region in parallel with said adjacent tracking tracks, a second region which is closer than said first region to one of said adjacent tracking tracks and is in parallel therewith, and a third region which connects said first region to said second region and forms said angle $\theta$ relative to said tracking track.

11. An optical information recording medium according to claim 9, wherein said first region of said auxiliary track is spaced apart from said adjacent tracking tracks by the same distance.

12. An optical information recording medium according to claim 3, wherein a second auxiliary track is disposed between said adjacent tracking tracks and has a first region in parallel with said adjacent tracking tracks and a second region which connects said first region to one of said adjacent tracking tracks and which makes a non-zero finite angle relative to the tracking track.

13. An optical information recording medium according to claim 12, wherein the following condition is satisfied $$\theta \leq \tan^{-1} 2Fx/V$$

where $\theta$ is the angle between said second region of said second auxiliary track and said tracking tack, V is the velocity of a light beam which is scanned on said recording medium, F is the response frequency in tracking, and x is the tracking amplitude at the frequency F.

14. An optical information recording medium of the type in which information is recorded or reproduced when a light beam scans each of a plurality of mutually parallel tracking tracks, characterized in that an auxiliary track is extended between the adjacent tracking tracks and has at least one portion which is spaced apart from said adjacent tracking tracks by the same distance and a portion which is in parallel with the tracking tracks.

15. An optical information recording medium as set forth in claim 14, wherein a clock track for detecting a clock signal is extended between the adjacent tracking tracks and spaced apart from said auxiliary track, said clock track being spaced apart from said adjacent tracking tracks by the same distance, and an information recording region for recording information therein being defined between said clock track and said tracking track.

16. A method of the type in which a plurality of light beams are made to scan predetermined tracking tracks of a plurality of mutually parallel tracking tracks extended on an optical information recording medium so that while one of said plurality of light beams detects a tracking signal, information is recorded or reproduced, characterized in that an auxiliary track is extended between the adjacent tracking tracks and has at least one portion which is spaced apart from the adjacent tracking tracks by the same distance and is in parallel therewith; and the light beam for detecting a tracking signal is switched in said parallel region of said auxiliary tracks.

17. An optical information recording medium of the type in which information is recorded or reproduced when a light beam scans each of a plurality of mutually parallel tracking tracks, characterized in that an auxiliary track having at least one portion which makes a limited angle 8 relative to said tracking track is disposed on said medium; and the following condition is satisfied $$\theta \leq \tan^{-1} 2Fx/V$$

where
V is the scanning velocity of a light beam;
F is the response frequency in tracking, and
x is the tracking amplitude at the frequency F.

18. An optical information recording medium of the type in which information is recorded or reproduced when a light beam scans each of a plurality of mutually parallel tracking tracks, characterized in that an auxiliary track is disposed between the adjacent tracking tracks and has a first region in parallel with said adjacent tracking tracks, a second region which is closer than said first region to one of said adjacent tracking tracks and is in parallel therewith and a third region which makes a limited angle relative to said tracking track.

19. An optical information recording medium as set forth in claim 18, wherein said first region of said auxiliary track is spaced apart from said adjacent tracking tracks by the same distance.

20. An optical information recording medium as set forth in claim 18, wherein the following condition is satisfied $$\theta \leq \tan^{-1} 2Fx/V$$

where
- $\theta$ is the angle between the third region of said auxiliary track and said tracking track,
- V is the scanning velocity of a light beam,
- F is the response frequency in tracking, and
- x is the tracking amplitude at the frequency F.

21. An optical information recording medium as set forth in claim 18, wherein a clock track for detecting a clock signal is extended between the adjacent tracking tracks, spaced apart therefrom by the same distance and is separated from said auxiliary track; and a recording region for recording information therein is defined between said clock track and said tracking track.

22. An optical information recording medium as set forth in claim 18, wherein a second auxiliary track is disposed between said adjacent tracking tracks and has a first region in parallel with said adjacent tracking tracks and a second region which connects said first region to one of said adjacent tracking tracks and which makes a limited angle relative to the tracking track.

23. An optical information recording medium as set forth in claim 22, wherein the following condition is satisfied $$\theta \leq \tan^{-1} 2Fx/V$$

where
- $\theta$ is the angle between said second region of said second auxiliary track,
- V is the scanning velocity of a light beam,
- F is the response frequency in tracking, and
- x is the tracking amplitude at the frequency F.

* * * * *

UNITED STATES PATENT AND TRADEMARK OFFICE
CERTIFICATE OF CORRECTION

PATENT NO. : 5,018,123

DATED : May 21, 1991

INVENTOR(S) : Hideki Hosoya, et al.

It is certified that error appears in the above-identified patent and that said Letters Patent is hereby corrected as shown below:

On the title page:

[56] References Cited

U.S. Patent Documents

"4,094,010 6/1978 Pepper" should read --4,094,010 6/1978 Pepperl--.

Foreign Patent Documents

"59-193558 11/1985 Japan" should read --59-193558 11/1984 Japan--.

COLUMN 1:

Line 32, "area," should read --area;--.
Line 42, "direction" should read --direction in--.
Line 48, "in,,the" should read --in the--.
Line 54, "recording reproducing" should read --recording-reproducing--.
Line 57, "arrows," should read --arrows;--.
Line 67, "nodes" should read --modes--.

COLUMN 2:

Line 44, "track represent" should read --track 125 is not completely recorded. Reference numerals 127, 128, and 129 represent--.

UNITED STATES PATENT AND TRADEMARK OFFICE
CERTIFICATE OF CORRECTION

PATENT NO. : 5,018,123

DATED : May 21, 1991

INVENTOR(S) : Hideki Hosoya, et al.

It is certified that error appears in the above-identified patent and that said Letters Patent is hereby corrected as shown below:

COLUMN 3:

Line 26, "becomes" should read --becomes high so that it--.
Line 27, align left margin.
Line 28, align right margin.
Line 29, "the" (first occurrence) should read --when the--.
Line 35, "in straight lines reciprocated" should read --reciprocated in straight lines--.

COLUMN 4:

Line 19, "$0 \leq \theta\tan^{-1}2Fx/v$" should read --$0 \leq \theta \leq \tan^{-1}2Fx/v$--.

COLUMN 5:

Line 23, "disposed distance." should read --disposed and spaced apart from each other by a predetermined distance.--.
Line 28, "track 2" should read --tracks 2--.
Line 30, "recording reproducing" should read --recording-reproducing--.
Line 37, align right margin.
Line 38, "15" should be deleted.
Line 52, "are" should read --is--.
Line 61, "tracks $3_1$," should read --track $3_1$,--.
Line 64, "light detector" should read --photodetector--.

COLUMN 6:

Line 22, "be," should read --be--.
Line 64, "dirction" should read --direction--.

UNITED STATES PATENT AND TRADEMARK OFFICE
CERTIFICATE OF CORRECTION

PATENT NO. : 5,018,123            Page 3 of 5
DATED     : May 21, 1991
INVENTOR(S) : Hideki Hosoya, et al.

It is certified that error appears in the above-identified patent and that said Letters Patent is hereby corrected as shown below:

COLUMN 7:

Line 1, "movves" should read --moves--.
    Line 19, "$\theta$'+ $\theta$tan$^{-1}$2Fx/v" should read --$\theta$'= tan$^{-1}$2Fx/v--.
    Line 46, "region A'," should read --region A,--.

COLUMN 8:

Line 22, "track" should read --track.--.
    Line 36, "inclination)," should read --inclination).--.
    Line 50, "contact" should read --terminal--.
    Line 51, "C8." should read --$C_8$.--.
    Line 52, "recieving" should read --receiving--.
    Line 54, "terminal C1" should read --terminal $C_1$--.
    Line 63, "terminal C6" should read --terminal $C_6$--.

COLUMN 9:

Line 2, "terminal C9" should read --terminal $C_9$--.
    Line 6, "contact" should read --terminal--.
    Line 7, "C3" should read --$C_3$--.
    Line 8, "contact C7." should read --terminal $C_7$.--.
    Line 9, "contact C1." should read --terminal $C_1$.--.
    Line 10, "contact C6." should read --terminal $C_6$.--.
    Line 11, "contact C4." should read --terminal $C_4$.--.
    Line 17, "which" should read --on which--.
    Line 25, "contact C2" should read ----terminal $C_2$.--.
    Line 26, "terminal C7." should read --terminal $C_7$.--.
    Line 31, "contact C10." should read --terminal $C_{10}$.--.
    Line 39, "contact C11" should read --terminal $C_{11}$--.
    Line 44, "contacts C1 and C6" should read --terminals $C_1$ and $C_6$--.

UNITED STATES PATENT AND TRADEMARK OFFICE
CERTIFICATE OF CORRECTION

PATENT NO. : 5,018,123

DATED : May 21, 1991

INVENTOR(S) : Hideki Hosoya, et al.

It is certified that error appears in the above-identified patent and that said Letters Patent is hereby corrected as shown below:

COLUMN 10:

Line 7, "spot s" should read --spot $s_1$.--.
Line 29, "there" should read --their--.
Line 36, "tracks 5" should read --tracks 85--.

COLUMN 11:

Line 66, "signal" should read --signals--.

COLUMN 12:

Line 34, "second" should read --third--.
Line 39, "abovedescribed" should read --above-described--.
Line 65, "sensor 147b" should read --sensor 147B--.

COLUMN 13:

Line 2, "sensor 147b" should read --sensor 147B--.
Line 6, "spot 148" should read --spot 88--.
Line 12, "track 123." should read --track 133.--.

COLUMN 14:

Line 4, "lest" should read --least--.

COLUMN 15:

Line 13, "fist" should read --first--.

UNITED STATES PATENT AND TRADEMARK OFFICE
CERTIFICATE OF CORRECTION

PATENT NO. : 5,018,123

DATED : May 21, 1991

INVENTOR(S) : Hideki Hosoya, et al.

It is certified that error appears in the above-identified patent and that said Letters Patent is hereby corrected as shown below:

COLUMN 16:

Line 10, "tack," should read --track,--.
    Line 50, "angle 8" should read --angle θ--.
    Line 57, "beam;" should read --beam,--.

Signed and Sealed this

Fifth Day of January, 1993

Attest:

DOUGLAS B. COMER

*Attesting Officer*      *Acting Commissioner of Patents and Trademarks*